(12) United States Patent
Perry

(10) Patent No.: US 9,558,423 B2
(45) Date of Patent: Jan. 31, 2017

(54) OBSERVER PREFERENCE MODEL

(71) Applicant: CANON KABUSHIKI KAISHA, Tokyo (JP)

(72) Inventor: Stuart William Perry, St. Ives (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 82 days.

(21) Appl. No.: 14/568,032

(22) Filed: Dec. 11, 2014

(65) Prior Publication Data

US 2015/0169982 A1    Jun. 18, 2015

(30) Foreign Application Priority Data

Dec. 17, 2013 (AU) ................................ 2013273630
May 20, 2014 (AU) ................................ 2014202744

(51) Int. Cl.
*G06K 9/46* (2006.01)
*G06K 9/52* (2006.01)
(Continued)

(52) U.S. Cl.
CPC ............ *G06K 9/4671* (2013.01); *G06K 9/52* (2013.01); *G06K 9/6256* (2013.01); *G06K 9/6262* (2013.01); *G06T 7/0002* (2013.01); *G06T 2207/10024* (2013.01); *G06T 2207/20076* (2013.01); *G06T 2207/30168* (2013.01)

(58) Field of Classification Search
None
See application file for complete search history.

(56) References Cited

U.S. PATENT DOCUMENTS 5,809,322 A * 9/1998 Akerib ................ G06F 15/8023
                                                         710/33
6,671,405 B1 * 12/2003 Savakis ............... G06K 9/00234
                                                         358/527
(Continued)

FOREIGN PATENT DOCUMENTS

AU    2011254040 B2    7/2013

OTHER PUBLICATIONS

Engelke, Ulrich; Kaprykowsky, Hagen; Zepernick, Hans-Jürgen; Ndjiki-Nya, Patrick. Visual Attention in Quality Assessment. IEEE Signal Processing Magazine, Nov. 2011, 28, pp. 50-59.
(Continued)

*Primary Examiner* — Chan Park
*Assistant Examiner* — Iman K Kholdebarin
(74) *Attorney, Agent, or Firm* — Canon USA, Inc. IP Division

(57) ABSTRACT

A computer implemented method for predicting preferences of an observer for two images, the method comprising the steps of: receiving the first image and an associated salience map indicating regions of the first image that are likely to be scrutinized by the observer; receiving a content masking map indicating differences between the first image and the second image that the observer is likely to be able to perceive; determining a number of preference measures; and processing the salience map and the content masking map to determine a distribution of a set of values of the preference measures predicting the preferences of the observer for the first image and the second image, the set of values of the preference measures having a number of degrees of freedom.

12 Claims, 20 Drawing Sheets

(51) Int. Cl.
*G06K 9/62* (2006.01)
*G06T 7/00* (2006.01)

(56) References Cited

U.S. PATENT DOCUMENTS

| | | | |
|---|---|---|---|
| 2005/0069206 A1* | 3/2005 | Ma | G06K 9/3233 382/190 |
| 2010/0086200 A1* | 4/2010 | Stankiewicz | G06K 9/4671 382/154 |
| 2010/0226564 A1* | 9/2010 | Marchesotti | G06F 17/30256 382/159 |
| 2011/0175904 A1* | 7/2011 | van Baar | H04N 13/0018 345/419 |
| 2011/0182502 A1* | 7/2011 | Liang | G06T 3/4007 382/162 |
| 2011/0199536 A1* | 8/2011 | Wolf | G06K 9/42 348/441 |
| 2011/0235910 A1* | 9/2011 | Soceanu | G06K 9/00295 382/173 |
| 2011/0305397 A1* | 12/2011 | Piramuthu | G06T 11/60 382/199 |
| 2013/0129195 A1* | 5/2013 | Ho | G06K 9/4671 382/154 |
| 2013/0223740 A1* | 8/2013 | Wang | G06T 7/0083 382/171 |
| 2014/0063275 A1* | 3/2014 | Krahenbuhl | G06T 7/0081 348/208.4 |
| 2015/0169983 A1* | 6/2015 | Kang | G06K 9/4676 382/154 |

OTHER PUBLICATIONS

Martin Cadik; Michael Wimmer; Laszlo Neumann; Alessandro Artusi. Evaluation of HDR tone mapping methods using essential perceptual attributes. Journal of Computer and Graphics, Jun. 2008, 32, pp. 330-349.

* cited by examiner

OBSERVER PREFERENCE MODEL

REFERENCE TO RELATED PATENT APPLICATION(S)

This application claims the benefit under 35 U.S.C. §119 of the filing date of Australian Patent Application No. 2013273630, filed 17 Dec. 2013, and of the filing date of Australian Patent Application No. 2014202744, filed 20 May 2014 hereby incorporated by reference in its entirety as if fully set forth herein.

TECHNICAL FIELD

The present invention relates generally to the field of images processing, and, in particular, to the field of processing of images according to their subjective quality as judged by humans.

BACKGROUND

A key problem in the field of image processing is how to predict whether an observer will prefer one image over another. A key selling point of many imaging devices such as cameras, scanners, printers and displays is the subjective quality of the images that the devices are asserted to produce. As the technology in imaging devices advances, the images produced by these devices become larger and the computing resources required to process them increase, thus becoming more onerous particularly on low-power devices such as cameras and smart phones. When allocating resources to processing/storing/displaying or printing an image based on assumptions about the subjective quality of the image it would be advantageous to use a reliable method to quantify the increase in subjective quality (also referred to as observer preference or observer preference score) between the original image of interest (also referred to as the target image), and the transformed image expected to be obtained from processing the original image.

From a terminology perspective, a "preference measure" is a measure of the degree to which an image will be selected over another image (or other images) based on desirable characteristics. In the aforementioned example the desirable characteristic being measured, is "subjective quality". The preference measure measures the degree to which one image is preferred to another based on subjective quality. The "value" of the preference measure is the quantitative value that is determined for the measure in question. This might for example be a numerical score of 6 in a possible range of 1-10. In this description the value of the preference measure in question is also referred to as the observer preference or the observer preference score.

There are many methods known in the prior art for predicting observer preference between two images where one has undergone a transform. Preference scores based on signal processing techniques such as Mean Square Error (MSE) and Peak Signal To Noise Ratio (PSNR) have been shown to have some ability to predict observer preference, but fail in many cases to make reliable predictions. There exist known methods that analyse the structural content of images and estimate observer preference based on the notion that observers prefer structural details to be preserved or enhanced in the transformed image. Other methods attempt to use machine learning to predict observer preference based on features extracted from either the original image, the transformed image or both images. Yet other methods attempt to partition the problem of estimating observer preference for an entire image into a sub-set of problems each attempting to estimate observer preference for a sub-aspect of the image. For example, sub-aspects of an image might include the relative quality of colour reproduction between the original and the transformed image, the quality of brightness reproduction, the quality of detail preservation and the presence or absence of artifacts in the transformed image. By merging the observer preference scores for each of the sub-aspects, a prediction of the overall observer preference score for the transformed image is obtained.

There also exist methods that attempt to quantify observer preference based on considerations of human cognition and vision. For example, recent methods have emerged that make use of salience and content masking information. Salience relates to image content within an image that attracts a user's attention. Some methods for producing salience maps represent salience information in the form of a "heat map" that indicates the regions of an image that are likely to be more closely scrutinized by observers. It is widely accepted that differences between an original and a transformed image have more of an effect on observer preference when these differences fall in salient regions of the image. Content masking (also termed "visual difference" in the prior art) technology takes advantage of the observation that not all changes to an image are noticeable by human observers. Changes to an image that are not noticeable are not likely to affect an observer preference for a transformed image. Content masking techniques produce a content masking map that indicates changes (ie differences) between the original and transformed images, ie changes arising from application of the transform to the target image, that observers will probably be physically able to see (ie differences that are visually perceptible) and also indicates how strong the differences will probably appear to the observer, ie the strength of the perceptibility. Stronger differences are more likely to affect observer preference than weaker differences. Recent methods to predict observer preference combine information extracted from salience maps with information from content masking maps to create a prediction of observer preference.

However, the prior art methods to quantify observer preference fail to perform well in many circumstances.

SUMMARY

It is an object of the present invention to substantially overcome, or at least ameliorate, one or more disadvantages of existing arrangements.

Disclosed are arrangements, referred to as Multiple degree-of-freedom (MDOF) arrangements, which seek to address the above problems by providing a more comprehensive set of observer preference values than prior art methods, in particular providing observer preference values having a plurality of degrees-of-freedom.

According to a first aspect of the present invention, there is provided a method for determining at least one parameter of an image process to be applied to a target image to form a transformed image, the method comprising the steps of:

receiving the target image to be processed using the image process, the target image being associated with a salience map determined for the target image;

receiving a content masking map associated with the target image, the content masking map comprising at least one metric corresponding to a degree of visual perceptibility of changes to the target image arising from the image transform being applied to the target image;

combining the salience map and the content masking map to determine a distribution of a set of preference measures with respect to the image transform, at least one of the preference measures being associated with an intermediate preference with respect to two other preferences; and determining the at least one parameter of the image process in accordance with the determined distribution of the preference measures.

According to another aspect of the present invention, there is provided a computer implemented method for predicting preferences of an observer for a first image and a second image, the method comprising the steps of:

receiving the first image and an associated salience map indicating regions of the first image that are likely to be scrutinized by the observer;

receiving a content masking map indicating differences between the first image and the second image that the observer is likely to be able to perceive; determining a plurality of preference measures; and processing the salience map and the content masking map to determine a distribution of a set of values of the preference measures predicting the preferences of the observer for the first image and the second image, said set of values of the preference measures having a plurality of degrees of freedom.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

One or more embodiments of the invention will now be described with reference to the following drawings, in which:

FIG. 10b is a representation of the process of reducing the distribution of observer preference scores shown in FIG. 10a;

DETAILED DESCRIPTION INCLUDING BEST MODE

Context

Figure 1A:
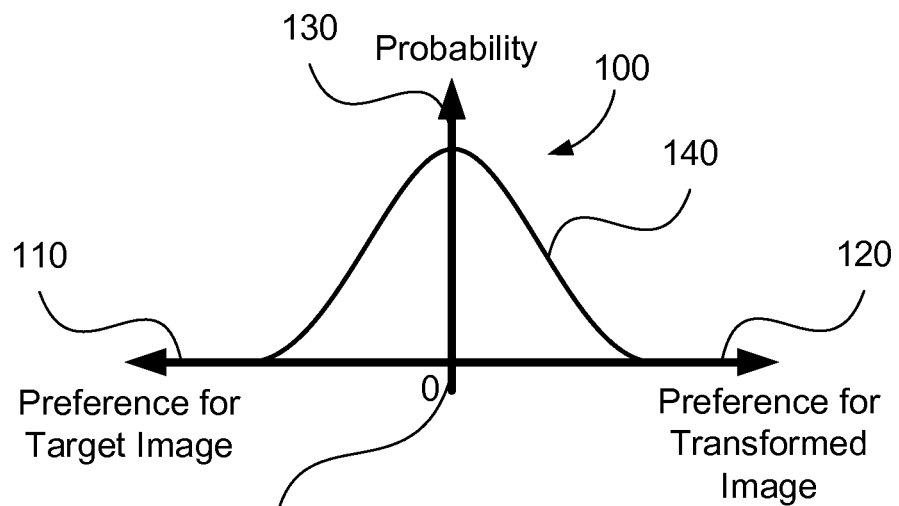
FIG. 1a is a representation of a distribution of observer preference scores in the case that observers are ambivalent about the perceptual quality difference of a target image/transformed image pair.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The prior art methods to quantify observer preference described in the "Background" section fail to perform well in many circumstances. The inventor has realised that one reason for this failing is the fact that prior art methods attempt to represent observer preference as a "preference score" comprising a single value. Often this score is compared to the results of psychophysical experiments where observers are asked to assign preference scores to a set of images with different transforms applied to each image. The preference scores are then averaged on a per-image or per-transform basis in order to produce mean preference scores comprising a single value. Performance of the above methods is then judged relative to how well they predict these mean preference scores.

The inventor has realised that a flaw in this approach is that mean preference scores comprising a single value do not adequately represent the complexity of human behaviour in regard to preference for images. Preference scores assigned by people often differ greatly from the mean preference scores for a population due to individual variation. Some people will greatly prefer a transformed image that others will find objectionable. The prior methods cannot capture the richness of this information and make use of it in useful ways.

Figure 17A:
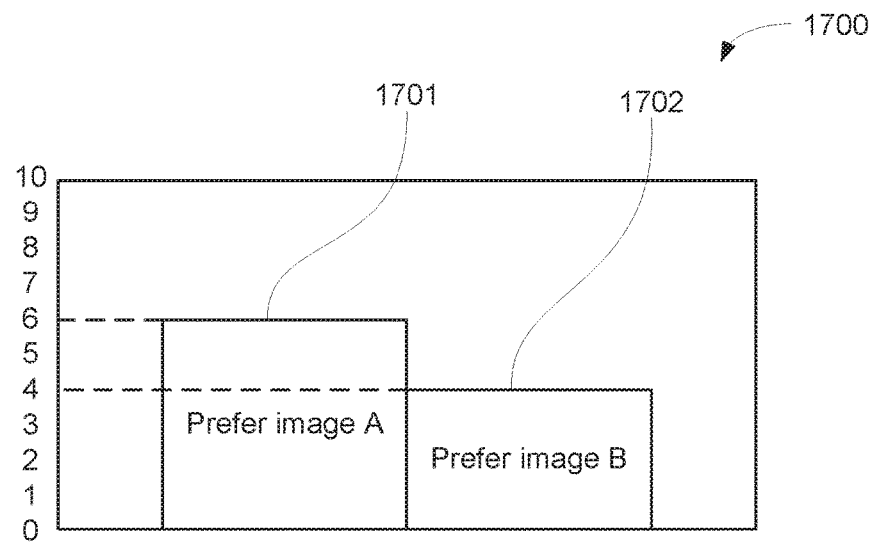
FIGS. 17A and 17B show how prior art systems have one degree of freedom when determining user preferences, while the MDOF arrangements have two or more degrees of freedom.

Typically, prior art methods determine a single preference, for example whether observers prefer an image A or an image B. This approach is depicted in FIG. 17A which depicts results 1700 of an experiment showing that 60% of observers prefer image A (see 1701), and 40% prefer image B (see 1702). The depicted preferences have one degree of freedom, because only one of the preferences can be established independently, while the other preference is defined by the fact that the sum of the preferences needs to add up to 100%. Thus if 1701 is 60%, then 1702 must be 40% to add up to 100%. Therefore, although this arrangement appears to determine two preferences, it actually only determines one preference independently, because the other preference is then fixed by the fact that the sum of the preferences needs to add up to 100%.

Figure 17B:
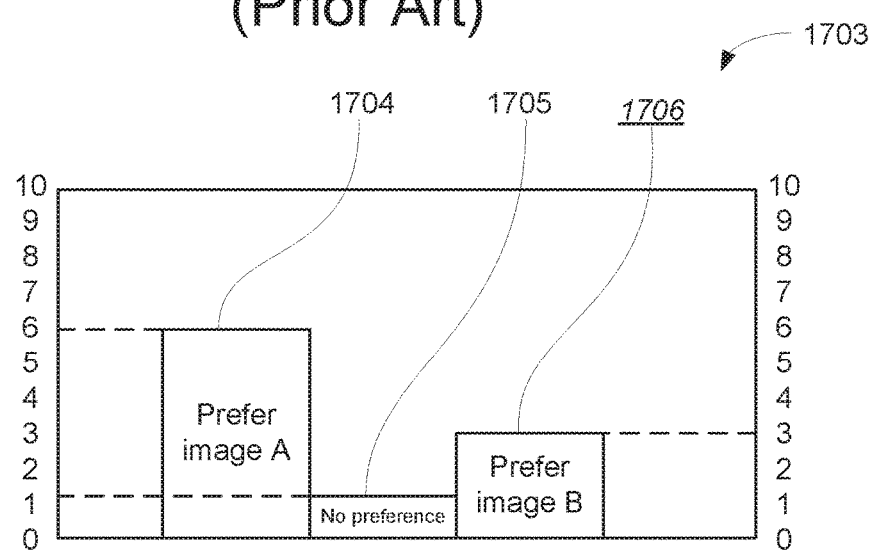

In contrast, the MDOF method determines a plurality of preferences, not just one as in the prior art. In one simple example 1703 depicted in FIG. 17B observers preferences are determined for three cases, namely (a) prefer image A (ie 1704), (b) prefer image B (ie 1706), or (c) have no preference (ie 1705). The depicted preferences have two degrees of freedom, because the arrangement determines two preferences independently while the third preference is then fixed by the fact that the sum of the preferences needs to add up to 100%. Although the sum of the three preferences still needs to add up to 100%, two of the three preferences can be thus be established independently. Therefore, if 1701 is 60%, and 1706 is 30% then 1705 must be 10% so that the three preferences add up to 100%. Although FIG. 17B depicts a two degree of freedom MDOF arrangement, the MDOF arrangement is not limited to this example and can be implemented as an N degree of freedom arrangement where N is any positive integer.

The context of the MDOF arrangement will now be described with references to FIGS. 1a, 1b, 2a, 2b, 3a, and 3b.

FIG. 1a is a representation of a distribution of observer preference scores in the case that observers are ambivalent about the perceptual quality of a target image/transformed image pair. A diagram 100 represents the results of a hypothetical psychophysical experiment. In this experiment a group of observers are presented with a target image and a transformed image. The transformed image is the result of applying an image processing transform (for example, contrast adjustment or chroma adjustment) to the target image. The observers assign a score to their preference between the two images on a scale. The precise form of the scale is not important. However, in the present example it is assumed that the preference measure is defined as the preference for the target image or the transformed image. More particularly, observers assign scores in the range of −100 to 100, where "−100" indicates a very strong preference for the target image and "100" indicated a very strong preference for the transformed image. Alternatively, if the experiment enables the observer to express a preference multiple times in an independent fashion, a score of "−100" may be regarded as signifying that an observer finds that the target image is preferable to the transformed image 100% of the time and "100" as signifying that an observer finds that the transformed image is preferable to the target image 100% of the time.

The diagram 100 shows a distribution 140 of observer preference scores produced by the aforementioned experiment. A horizontal axis 110 to 120 of the plot represents the score value given by observers, where scores on the left end 110 of the axis indicate preference for the target image and scores on right end 120 indicate preference for the transformed image. Scores in the centre of the axis 115 indicate indifference toward the target and transformed images in terms of preference, in other words, observers that indicate that they do not prefer one image over the other. A vertical axis 130 represents the frequency with which observers assign scores at the various preference levels, normalised to represent the probability that an observer in the group studied would assign that score. Alternatively, the frequency can be normalised to represent percentages, or left as counts of observers. For example, if 40 observers out of 100 indicated a given preference level, then this may be represented as a frequency of 4/10, a probability of 40% or a count of 40 on the vertical axis 130. In the diagram 100, the distribution 140 of the scores forms a Gaussian-like distribution centred on a "0" score indicating that the most commonly assigned score was "0" (or "no preference").

In prior art techniques this distribution would be reduced to a single number by averaging the scores assigned by the observers. This process can also be viewed in terms of summing the areas under the preference distribution 140.

Figure 1B:
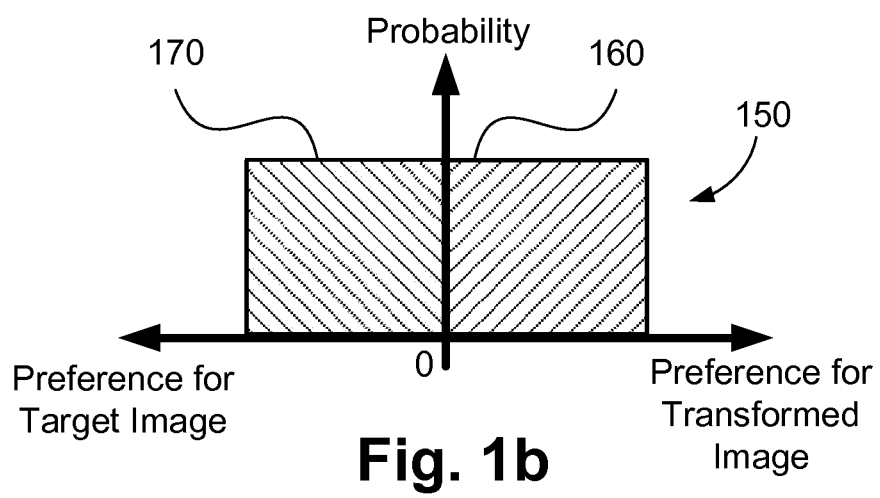
FIG. 1b is a representation of the process of reducing the distribution of observer preference scores shown in FIG. 1a to a preference score comprising a single value.

FIG. 1b is a representation of the process of reducing the distribution of observer preference scores shown in FIG. 1a to a preference score comprising a single value. A diagram 150 in FIG. 1b shows a representation of this process, depicting rectangular regions 170, 160 superimposed over the respective left and right hand sides of the distribution 140 in FIG. 1a. The average of scores indicating preference for the transformed image can be computed by determining the area under the preference distribution 140 in the region 160. This will be a positive number, referred to as PTran. The average of scores indicating preference for the target image can be computed by determining the area under the preference distribution 140 in the region 170. This will also be a positive number, referred to as PTar. It can be readily seen that PTran and PTar will be approximately equal in the case that the distribution of observer preference scores takes the form of 140. The mean observer preference score is then obtained by subtracting PTar from PTran. The results of this process will be a mean score of zero reflecting the fact that most observers had no preference between the target and transformed images.

Figure 2A:
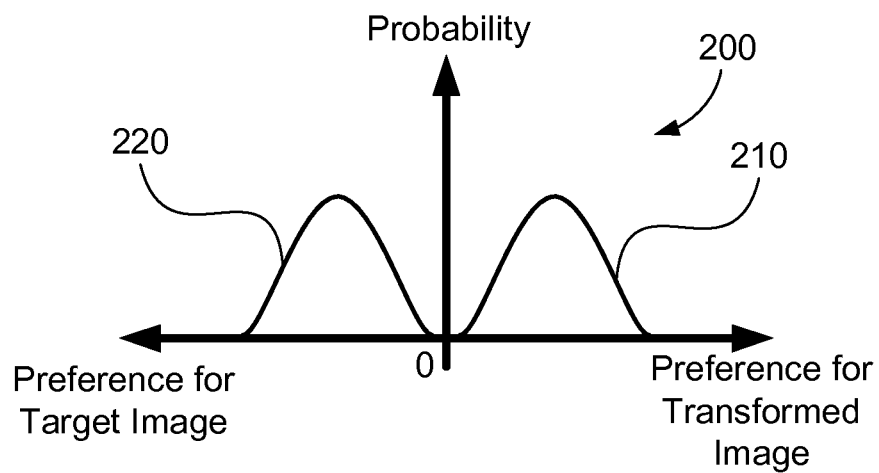
FIG. 2a is a representation of a distribution of observer preference scores in the case that observers are evenly divided about the perceptual quality difference of a target image/transformed image pair.

FIG. 2a is a representation of a distribution of observer preference scores in the case that observers are evenly divided about the perceptual quality of a target image/transformed image pair. In particular, a diagram 200 in FIG. 2a shows a different set of results to those depicted in FIG. 1a. In this case, the observer scores are represented by two Gaussian-like distributions 210 and 220. One distribution 210 is centred on a preference score in favour of the transformed image. This distribution represents a set of observers that prefer the transformed image over the target image. The other distribution 220 is centred on a preference score in favour of the target image. This distribution represents a set of observers that prefer the target image over the transformed image. In this experiment very few observers indicate that they had no preference for either the target or transformed images.

Figure 2B:
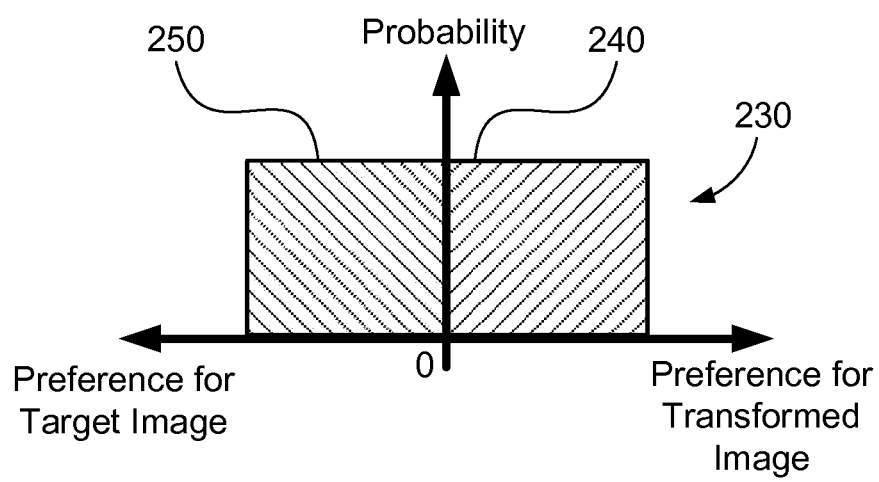
FIG. 2b is a representation of the process of reducing the distribution of observer preference scores shown in FIG. 2a to a preference score comprising a single value.

FIG. 2b is a representation of the process of reducing the distribution of observer preference scores shown in FIG. 2a to a preference score comprising a single value. In particular, a diagram 230 in FIG. 2b shows a process of averaging the distribution of observer preference scores indicated in 200 to determine a single mean observer preference score. The average of scores indicating preference for the transformed image are computed by determining the area under the preference distribution in 200 in a region 240. This will be a positive number, PTran. The average of scores indicating preference for the target image can be computed by determining the area under the preference distribution in 200 in a region 250. This will also be a positive number, PTar. It can be readily seen that PTran and PTar will be approximately equal in the case that the distribution of observer preference scores takes the form of the distribution in 200. The mean observer preference score is the obtained by subtracting PTar from PTran. The results of this process will be a mean score of zero similar to the calculation described above for FIG. 1b. However, the meaning of a zero mean score in this case is very different to the case in FIGS. 1a and 1b. In the case of FIGS. 2a and 2b a score of zero reflects the fact that the transformed image was "controversial" in the sense that observers were equally divided on whether they preferred it or not. This case can be considered a case of "divided preference", since the transformed image divides the observers into two different groups based on their preference. In the case of FIGS. 1a and 1b a score of zero reflects the fact that most observers expressed no preference between the target and transformed images. Clearly, averaging the preference scores of the observers to reduce the scores to a single number does not capture this crucial piece of information about the preference behaviour of the observers. As will be shown in the MDOF arrangements, knowledge of the form of the distribution of observer preference scores can be used to advantageously process images.

The inventors have conducted psychophysical experiments in regard to observer preference for chroma modifications and often observed distributions of observer preference scores similar to that shown in 200. When the transformed image is obviously different to the target image, the inventors find that observers tend to not assign preference scores that reflect "no preference" assertions. Rather the observers divide into two groups, one group favouring the transformed image and one group favouring the target image. As the change in chroma is increased, observer opinions typically shift from the group favouring the transformed image into the group favouring the target image, without passing through a stage of having "no preference".

The MDOF arrangement is a method for processing images taking into account a prediction of observer preference scores. In the MDOF arrangement, instead of modeling observer preference as a preference score in the form of a single value, the observer preference is modeled using a set of preference measures that together are used to represent the observer preference score distribution. With only a few of these preference measures, the problems highlighted above in respect to prior art methods can be resolved. In one example, three preference measures are used in regard to an original (ie target) image A and a transformed image B (which is an image obtained by applying a transform process to the target image A). The three preference measures are (i) prefer image A, (ii) prefer image B, and (iii) are indifferent (ie don't care).

Figure 16A:
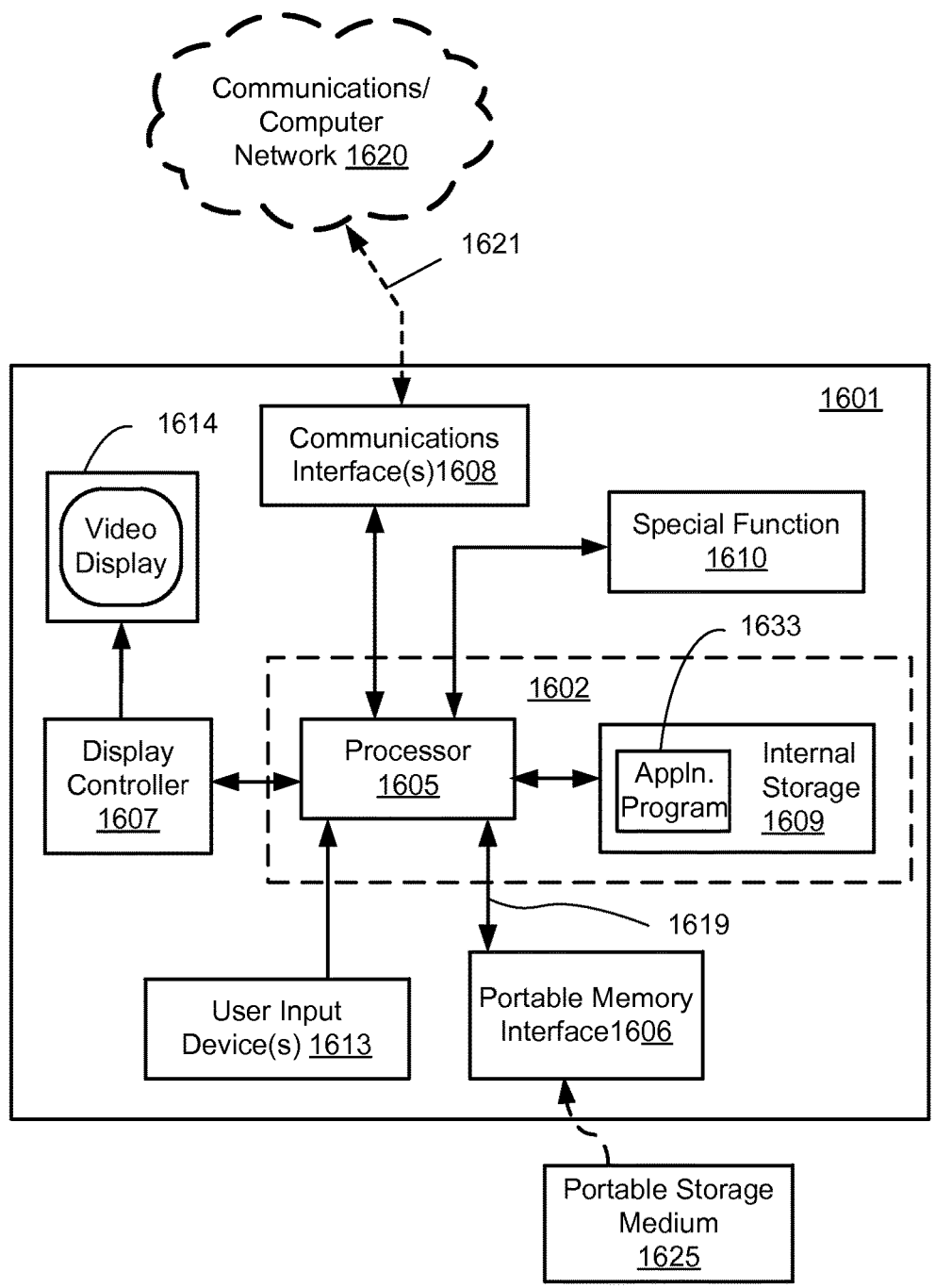
FIGS. 16A and 16B collectively form a schematic block diagram representation of an electronic device upon which described arrangements can be practised.
Figure 16B:
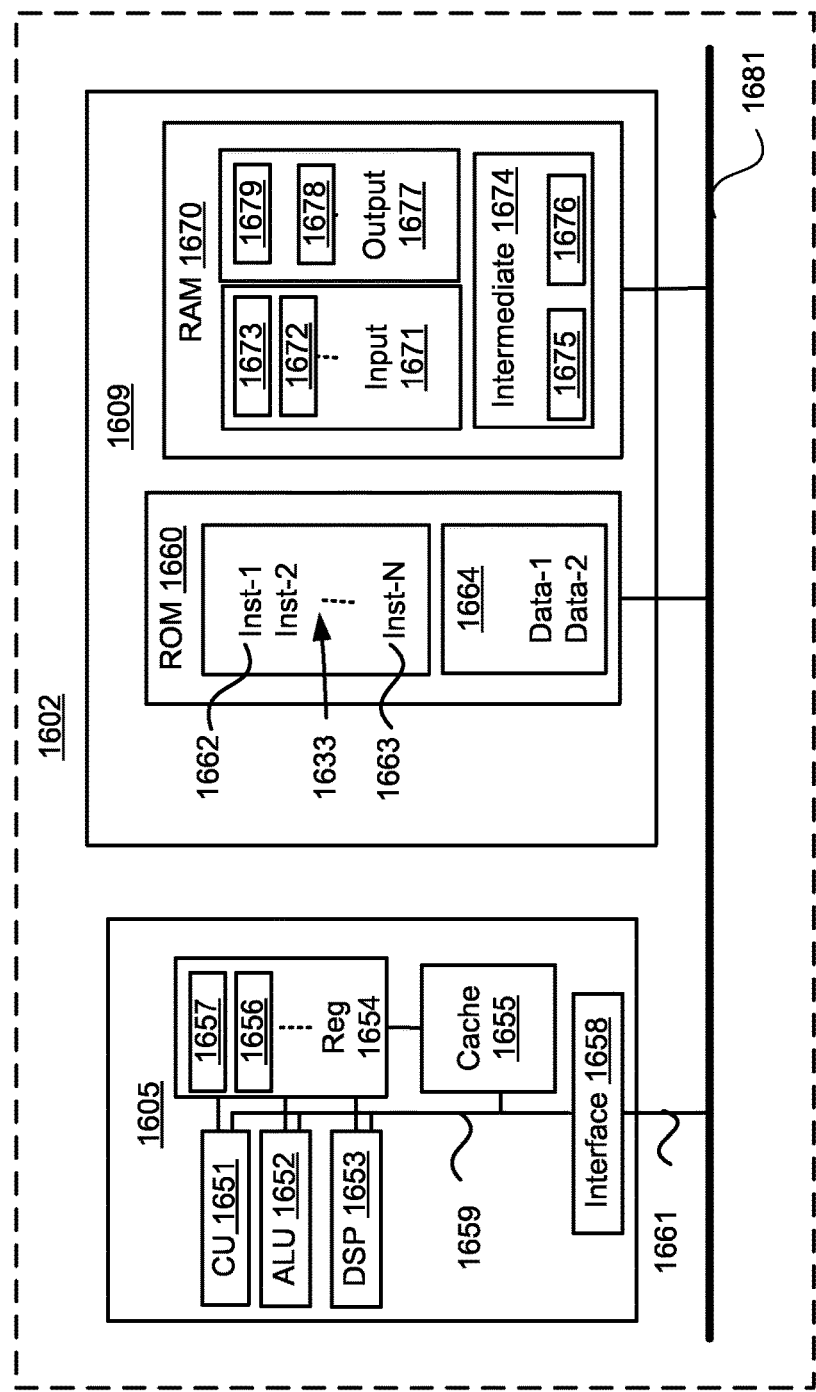

FIGS. 16A and 16B collectively form a schematic block diagram representation of an electronic device upon which described arrangements can be practised.

FIGS. 16A and 16B collectively form a schematic block diagram of a general purpose electronic device 1601 including embedded components, upon which the MDOF methods to be described are desirably practiced. The electronic device 1601 may be, for example, a mobile phone, a portable media player or a digital camera, in which processing resources are limited. Nevertheless, the methods to be described may also be performed on higher-level devices such as desktop computers, server computers, and other such devices with significantly larger processing resources.

As seen in FIG. 16A, the electronic device 1601 comprises an embedded controller 1602. Accordingly, the electronic device 1601 may be referred to as an "embedded device." In the present example, the controller 1602 has a processing unit (or processor) 1605 which is bi-directionally coupled to an internal storage module 1609. The storage module 1609 may be formed from non-volatile semiconductor read only memory (ROM) 1660 and semiconductor random access memory (RAM) 1670, as seen in FIG. 16B. The RAM 1670 may be volatile, non-volatile or a combination of volatile and non-volatile memory.

The electronic device 1601 includes a display controller 1607, which is connected to a video display 1614, such as a liquid crystal display (LCD) panel or the like. The display controller 1607 is configured for displaying graphical images on the video display 1614 in accordance with instructions received from the embedded controller 1602, to which the display controller 1607 is connected.

The electronic device 1601 also includes user input devices 1613 which are typically formed by keys, a keypad or like controls. In some implementations, the user input devices 1613 may include a touch sensitive panel physically associated with the display 1614 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 16A, the electronic device 1601 also comprises a portable memory interface 1606, which is coupled to the processor 1605 via a connection 1619. The portable memory interface 1606 allows a complementary portable memory device 1625 to be coupled to the electronic device 1601 to act as a source or destination of data or to supplement the internal storage module 1609. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1601 also has a communications interface 1608 to permit coupling of the device 1601 to a computer or communications network 1620 via a connection 1621. The connection 1621 may be wired or wireless. For example, the connection 1621 may be radio frequency or optical. An example of a wired connection includes Ethernet. Further, an example of wireless connection includes Bluetooth® type local interconnection, Wi-Fi (including protocols based on the standards of the IEEE 802.11 family), Infrared Data Association (IrDa) and the like.

Typically, the electronic device 1601 is configured to perform some special function. The embedded controller 1602, possibly in conjunction with further special function components 1610, is provided to perform that special function. For example, where the device 1601 is a digital camera, the components 1610 may represent a lens, focus control and image sensor of the camera. The special function components 1610 is connected to the embedded controller 1602. As another example, the device 1601 may be a mobile telephone handset. In this instance, the components 1610 may represent those components required for communications in a cellular telephone environment. Where the device 1601 is a portable device, the special function components 1610 may represent a number of encoders and decoders of a type including Joint Photographic Experts Group (JPEG), (Moving Picture Experts Group) MPEG, MPEG-1 Audio Layer 3 (MP3), and the like.

The methods described hereinafter may be implemented using the embedded controller 1602, where the processes of FIGS. 4, 5, 10, 11, 13 and 14 may be implemented as one or more software application programs 1633 executable within the embedded controller 1602. The electronic device 1601 of FIG. 16A implements the described MDOF methods. In particular, with reference to FIG. 16B, the steps of the described methods are effected by instructions in the software 1633 that are carried out within the controller 1602. The software instructions may be formed as one or more code modules, each for performing one or more particular tasks. The software may also be divided into two separate parts, in which a first part and the corresponding code modules performs the described methods and a second part and the corresponding code modules manage a user interface between the first part and the user.

The software 1633 of the embedded controller 1602 is typically stored in the non-volatile ROM 1660 of the internal storage module 1609. The software 1633 stored in the ROM 1660 can be updated when required from a computer readable medium. The software 1633 can be loaded into and executed by the processor 1605. In some instances, the processor 1605 may execute software instructions that are located in RAM 1670. Software instructions may be loaded into the RAM 1670 by the processor 1605 initiating a copy of one or more code modules from ROM 1660 into RAM 1670. Alternatively, the software instructions of one or more code modules may be pre-installed in a non-volatile region of RAM 1670 by a manufacturer. After one or more code modules have been located in RAM 1670, the processor 1605 may execute software instructions of the one or more code modules.

The application program 1633 is typically pre-installed and stored in the ROM 1660 by a manufacturer, prior to distribution of the electronic device 1601. However, in some instances, the application programs 1633 may be supplied to the user encoded on one or more CD-ROM (not shown) and read via the portable memory interface 1606 of FIG. 16A prior to storage in the internal storage module 1609 or in the portable memory 1625. In another alternative, the software application program 1633 may be read by the processor 1605 from the network 1620, or loaded into the controller 1602 or the portable storage medium 1625 from other computer readable media. Computer readable storage media refers to any non-transitory tangible storage medium that participates in providing instructions and/or data to the controller 1602 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1601. Examples of transitory or non-tangible computer readable transmission media that may also participate in the provision of software, application programs, instructions and/or data to the device 1601 include radio or infrared transmission channels as well as a network connection to another computer or networked device, and the Internet or Intranets including e-mail transmissions and information recorded on Websites and the like. A computer readable medium having such software or computer program recorded on it is a computer program product.

The second part of the application programs 1633 and the corresponding code modules mentioned above may be executed to implement one or more graphical user interfaces (GUIs) to be rendered or otherwise represented upon the display 1614 of FIG. 16A. Through manipulation of the user input device 1613 (e.g., the keypad), a user of the device 1601 and the application programs 1633 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 16B illustrates in detail the embedded controller 1602 having the processor 1605 for executing the application programs 1633 and the internal storage 1609. The internal storage 1609 comprises read only memory (ROM) 1660 and random access memory (RAM) 1670. The processor 1605 is able to execute the application programs 1633 stored in one or both of the connected memories 1660 and 1670. When the electronic device 1601 is initially powered up, a system program resident in the ROM 1660 is executed. The application program 1633 permanently stored in the ROM 1660 is sometimes referred to as "firmware". Execution of the firmware by the processor 1605 may fulfill various functions, including processor management, memory management, device management, storage management and user interface.

The processor 1605 typically includes a number of functional modules including a control unit (CU) 1651, an arithmetic logic unit (ALU) 1652 and a local or internal memory comprising a set of registers 1654 which typically contain atomic data elements 1656, 1657, along with internal buffer or cache memory 1655. One or more internal buses 1659 interconnect these functional modules. The processor 1605 typically also has one or more interfaces 1658 for communicating with external devices via system bus 1681, using a connection 1661.

The application program 1633 includes a sequence of instructions 1662 though 1663 that may include conditional branch and loop instructions. The program 1633 may also include data, which is used in execution of the program

1633. This data may be stored as part of the instruction or in a separate location 1664 within the ROM 1660 or RAM 1670.

In general, the processor 1605 is given a set of instructions, which are executed therein. This set of instructions may be organised into blocks, which perform specific tasks or handle specific events that occur in the electronic device 1601. Typically, the application program 1633 waits for events and subsequently executes the block of code associated with that event. Events may be triggered in response to input from a user, via the user input devices 1613 of FIG. 16A, as detected by the processor 1605. Events may also be triggered in response to other sensors and interfaces in the electronic device 1601.

The execution of a set of the instructions may require numeric variables to be read and modified. Such numeric variables are stored in the RAM 1670. The disclosed method uses input variables 1671 that are stored in known locations 1672, 1673 in the memory 1670. The input variables 1671 are processed to produce output variables 1677 that are stored in known locations 1678, 1679 in the memory 1670. Intermediate variables 1674 may be stored in additional memory locations in locations 1675, 1676 of the memory 1670. Alternatively, some intermediate variables may only exist in the registers 1654 of the processor 1605.

The execution of a sequence of instructions is achieved in the processor 1605 by repeated application of a fetch-execute cycle. The control unit 1651 of the processor 1605 maintains a register called the program counter, which contains the address in ROM 1660 or RAM 1670 of the next instruction to be executed. At the start of the fetch execute cycle, the contents of the memory address indexed by the program counter is loaded into the control unit 1651. The instruction thus loaded controls the subsequent operation of the processor 1605, causing for example, data to be loaded from ROM memory 1660 into processor registers 1654, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the MDOF methods described is associated with one or more segments of the application program 1633, and is performed by repeated execution of a fetch-execute cycle in the processor 1605 or similar programmatic operation of other independent processor blocks in the electronic device 1601.

Figure 3A:
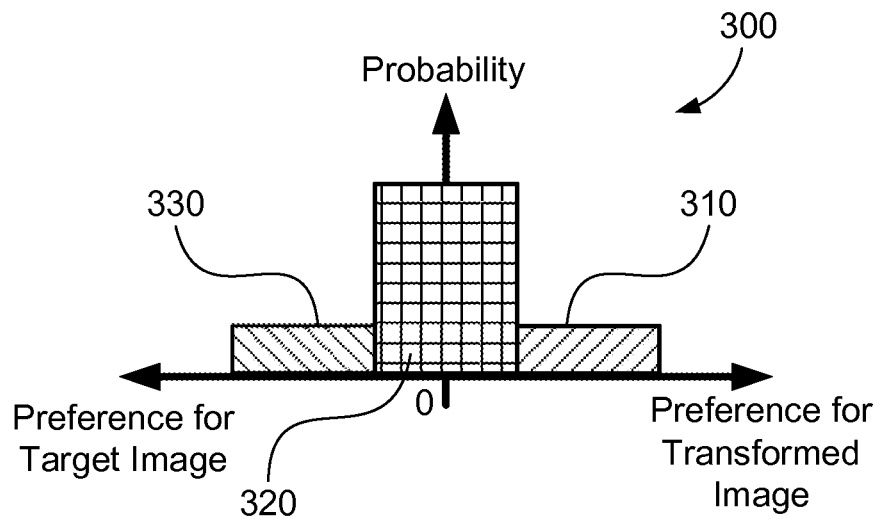
FIG. 3a is a representation of the distribution of observer preference scores shown in FIG. 1a according to one MDOF arrangement.

FIG. 3a is a representation of the distribution of observer preference scores shown in FIG. 1a according to one MDOF arrangement. In a first MDOF arrangement, three preference measures are used to represent observer preference. In a case such as the observer preference scores depicted in the distribution 140 shown in FIG. 1a, the preference measures can take a form as depicted by 300 in FIG. 3a. Diagram 300 shows three preference measures 310, 320 and 330.

The preference measure 310 represents the probability of observers assigning preference scores indicating their preference for the transformed image. There are many ways to obtain the value of preference measure 310. The preference value (also referred to as the preference score) for the preference measure 310 can be obtained by counting the frequency of occurrence of numeric observer preference scores falling above a certain threshold (for example, scores above 30) and normalising the frequency to represent a probability or a percentage. Alternatively the preference value can be obtained by performing an experiment in which (A) observers are asked directly whether they either prefer the transformed image, have no preference, or prefer the target image, and (B) the number of times observers state that they prefer the transformed image is counted. In another method, the preference value can be obtained by merely asking the observers whether they prefer the transformed image and counting the number of observers that consistently indicate that they prefer the transformed image more than a certain percentage of the time (for example, 80%).

The preference measure 320 represents the probability of observers assigning preference scores corresponding to "no preference" for either the target image or the transformed image. There are many ways to obtain the value of the preference measure 320. The value can for example be obtained by counting the frequency of occurrence of numeric observer preference scores falling between two thresholds (for example, scores between −30 and 30) and normalising the frequency to represent a probability or a percentage. Alternatively the value can be obtained by an experiment where observers are asked directly whether they prefer the transformed image, have no preference, or prefer the target image, and then the number of times observers state that they had no preference is counted. In another method, the value can be obtained by merely asking the observers whether they prefer the transformed image and count the number of observers that consistently indicate they prefer the transformed image within a certain percentage of the time (for example, 20% to 80%).

The preference measure 330 represents the probability of observers assigning preference scores corresponding to their preference for the target image. There are many ways to obtain the value of the preference measure 330. The value can be obtained by counting the frequency of occurrence of numeric observer preference scores falling below a certain threshold (for example, scores below −30) and normalising the frequency to represent a probability or a percentage. Alternatively the value can be obtained by an experiment in which observers are asked directly whether they prefer the transformed image, have no preference, or prefer the target image and counting the number of times observers state that they prefer the target image. In another method, the value can be obtained by merely asking the observers whether they prefer the transformed image and counting the number of observers that consistently indicate they prefer the transformed image less than a certain percentage of the time (for example, 20%).

In the diagram 300 the largest value of the three preference measures is the value of the preference measure 320 corresponding to the "no preference" case, reflecting that this was the most common observer preference score indicated by the distribution 140 in FIG. 1a.

Figure 3B:
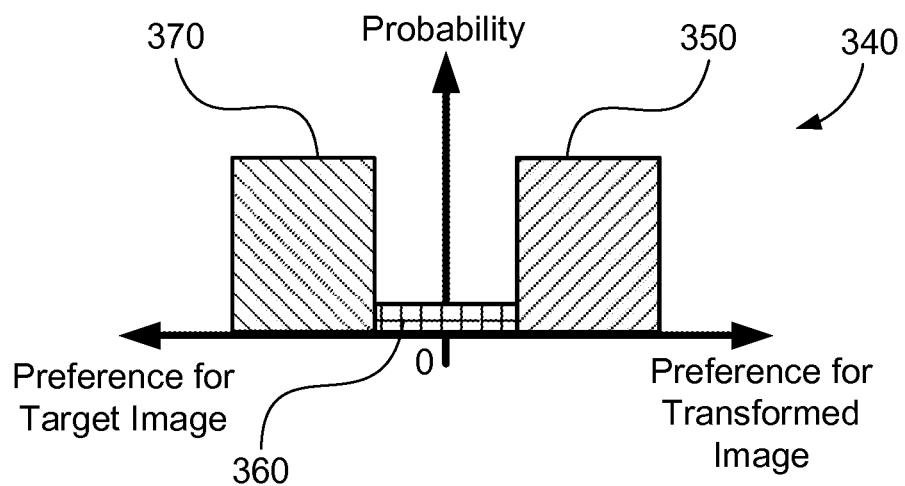
FIG. 3b is a representation of the distribution of observer preference scores shown in FIG. 2a according to one MDOF arrangement.

FIG. 3b is a representation of the distribution of observer preference scores shown in FIG. 2a according to one MDOF arrangement. In particular, a diagram 340 in FIG. 3b shows preference measure values in the case that the distribution of observer preference scores follows the example shown in FIG. 2a. Three preference measures have been determined. A preference measure 350 corresponds to an observer preference for the transformed image. A preference measure 360 corresponds to observers having no preference, and a preference measure 370 corresponds to observers having a preference for the target image. In this case the value of the preference measure 360 corresponding to observers having no preference is lower in value than the values of the other preference measures, correctly reflecting the "divided preference" case shown in FIG. 2a.

The examples shown above use three preference measures to describe the observer preference distribution, however larger numbers of preference measures can also be used by the MDOF arrangement. As will be shown below, the MDOF arrangement is a method to process images according to observer preference in a manner that is much more flexible and much more informative than the prior art methods. This MDOF arrangement can be used in a wide variety of applications. The MDOF arrangement can, for example, be used (a) to choose whether to store a transformed image, (b) to select the best parameters to process an image to create a transformed image, (c) to evaluate image processing transforms created by a user or device designer, (d) to choose images that might be best suited to an image processing transform, (e) to arrange transformed images on a display, (f) to choose an optimal transformed image for printing or display, or many other applications.

In the description below we will describe MDOF arrangements in more detail.

Overview of the MDOF Arrangement

Method for Applying a Process to an Image

Figure 4:
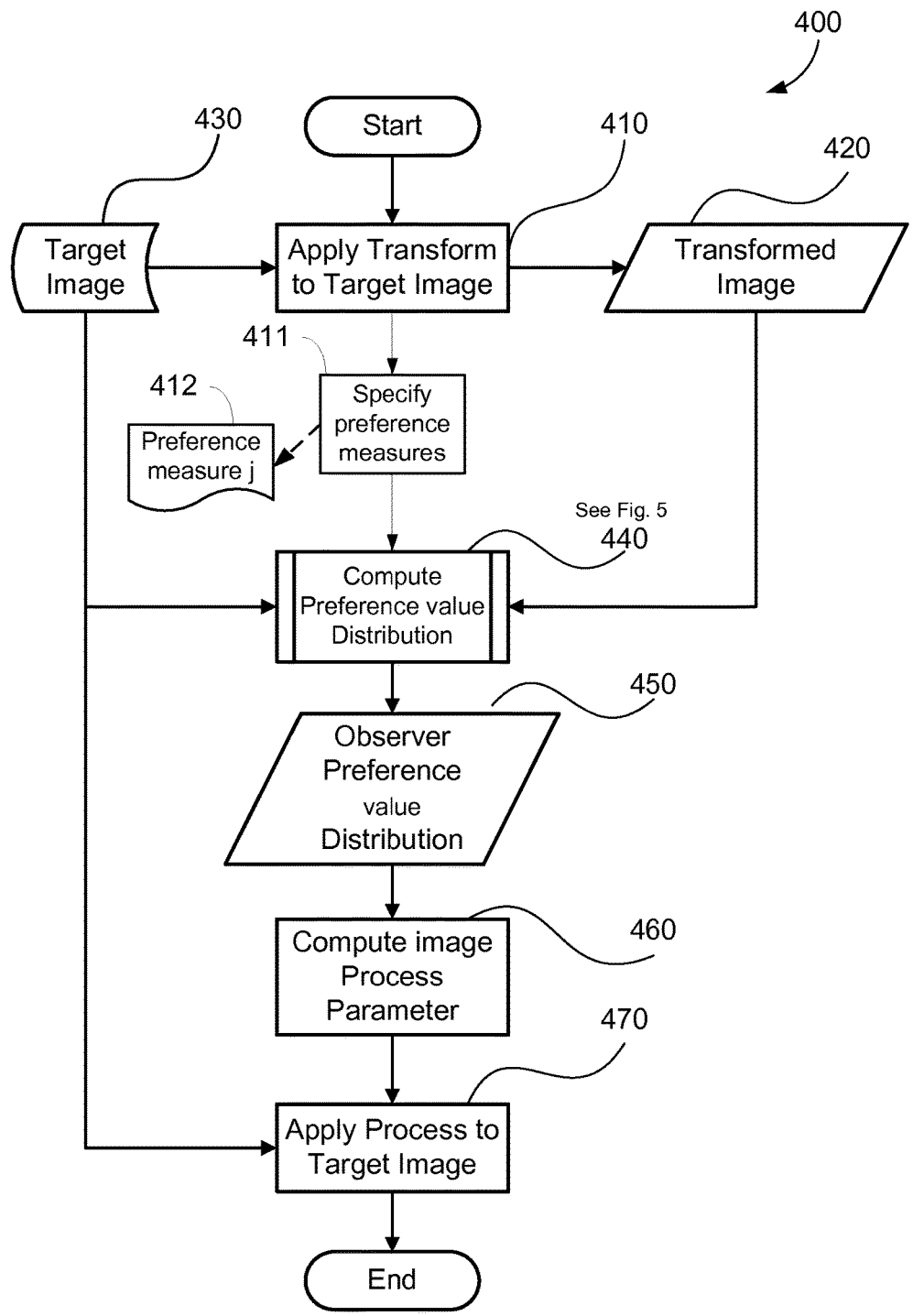
FIG. 4 is a schematic flow diagram illustrating a method of applying a process to an image according to observer preference for an image transform according to one MDOF arrangement.

FIG. 4 is a schematic flow diagram illustrating a method 400, performed by the processor 1605 directed by the MDOF software application 1633, of applying a process to an image according to observer preference for an image transform according to one MDOF arrangement. This process may be one of the processes described above or any appropriate image process. The method 400 starts at a step 410, performed by the processor 1605 directed by the MDOF software application 1633, where a transform is applied to a target image 430 to produce a transformed image 420. The transform applied by the step 410 is typically an operation that changes the visual appearance of the transformed image in a way that may cause the observer to prefer either the target image 430 or the transformed image 420. Example transforms include modifications to the luminance, saturation, hue, chroma, contrast, noise level, of all or part of the target image 430. Other transforms include resizing, cropping, and modifying the composition of the target image 430 by adding or removing content. All of these transforms may affect the observer's preference for the transformed image 420 in relation to the target image 430.

The method then proceeds to a step 411 which specifies preference measures (such as a preference measure 412) which are to be applied in the present example. In one example, three preference measures are used in regard to the original (ie target) image A (ie 430) and the transformed image B (which is the image 420 obtained by applying a transform process to the target image A). The three preference measures in this example are (i) prefer image A, (ii) prefer image B, and (iii) are indifferent (ie don't care).

The method 400 then proceeds to a step 440, performed by the processor 1605 directed by the MDOF software application 1633, which determines an observer preference distribution. The step 440 is described hereinafter in more detail below with reference to FIG. 5. The result of the step 440 is an observer preference value distribution 450. The observer preference distribution 450 is a prediction of the distribution of observer preference scores for either the target image 430 or the transformed image 420. The observer preference score can range from a strong preference for the target image 430 to a strong preference for the transformed image 420 and may also assume intermediate levels of preference such as "don't care". The preference distribution scores 450 may be represented by a discrete number of preference measure bins such as depicted by 300 and 340 in FIG. 3a and FIG. 3b respectively. Alternatively, the preference distribution scores 450 can be represented by a mathematical formula (or the coefficients of a mathematical formula) representing a continuous distribution of preference scores. The method 400 then proceeds to a step 460, performed by the processor 1605 directed by the MDOF software application 1633, where a parameter (or a set of parameters) associated with a process to be applied to the target image is determined. Possible processes and relevant process parameters for step 460 have been described above (such as the determination of a chroma adjustment value) and will be further elaborated on in the discussion of MDOF arrangements below (such as in FIG. 13). A simple example of a process to apply to the target image is whether to save the target image 430 or the transformed image 420 (or both) to the memory 1609 based on the form of the observer preference value distribution 450. In this example, the process parameter to compute in the step 460 can be a process flag indicating whether to save the target image 430, the transformed image 420, or both. The process flag can, in one example, be set according to the observer preference value distribution 450 in the following way:

If the observer preference value distribution 450 shows a a large value for the preference measure indicating preference for the transformed image 420, and values of the distribution 450 for other preference measures such as indicating preference for the target image 430 have low values then the process flag can be set to indicate that the transformed image 420 should be saved to the memory 1609.

If on the other hand the observer preference value distribution 450 shows a strong preference for the target image 430, and values of the distribution 450 for other preference measures such as for the transformed image 420 have low values then the process flag can be set to indicate that the target image 430 should be saved to permanent memory.

If the observer preference value distribution shows strong preferences for both the target image 430 and the transformed image 420 and low preferences for intermediate levels of preference between the two images, then this can be interpreted as a prediction that observers will be divided in their opinions of the images (the "divided preference case" described above). In this case, both images can be saved to the memory 1609 to accommodate both observers that prefer the target image 430 and those that prefer the transformed image 420.

If the observer preference value distribution 450 shows large values in preference levels associated with intermediate levels of preference between the target image 430 and the transformed image 420, then this can be interpreted as a prediction that observers do not favour either the target image 430 or the transformed image 420 and the process flag may be set to indicate that either image can be saved to permanent memory. Additional considerations such as memory storage requirements can be used to determine which of the images should be saved. For example, the transform applied in step 410, might be a reduction in the size of the target image, in which case, the transformed image 420 can be selected to be saved to permanent memory as it is smaller than the target image 430.

The method 400 then proceeds to a step 470, performed by the processor 1605 directed by the MDOF software application 1633, where the process is applied to the target image 430 using the computed process parameter determined in the step 460. In the present example, this would involve saving the image or images indicated by the process flag to the memory 1609. The method 400 then ends.

A Method for Computing an Observer Preference Distribution

Figure 5:
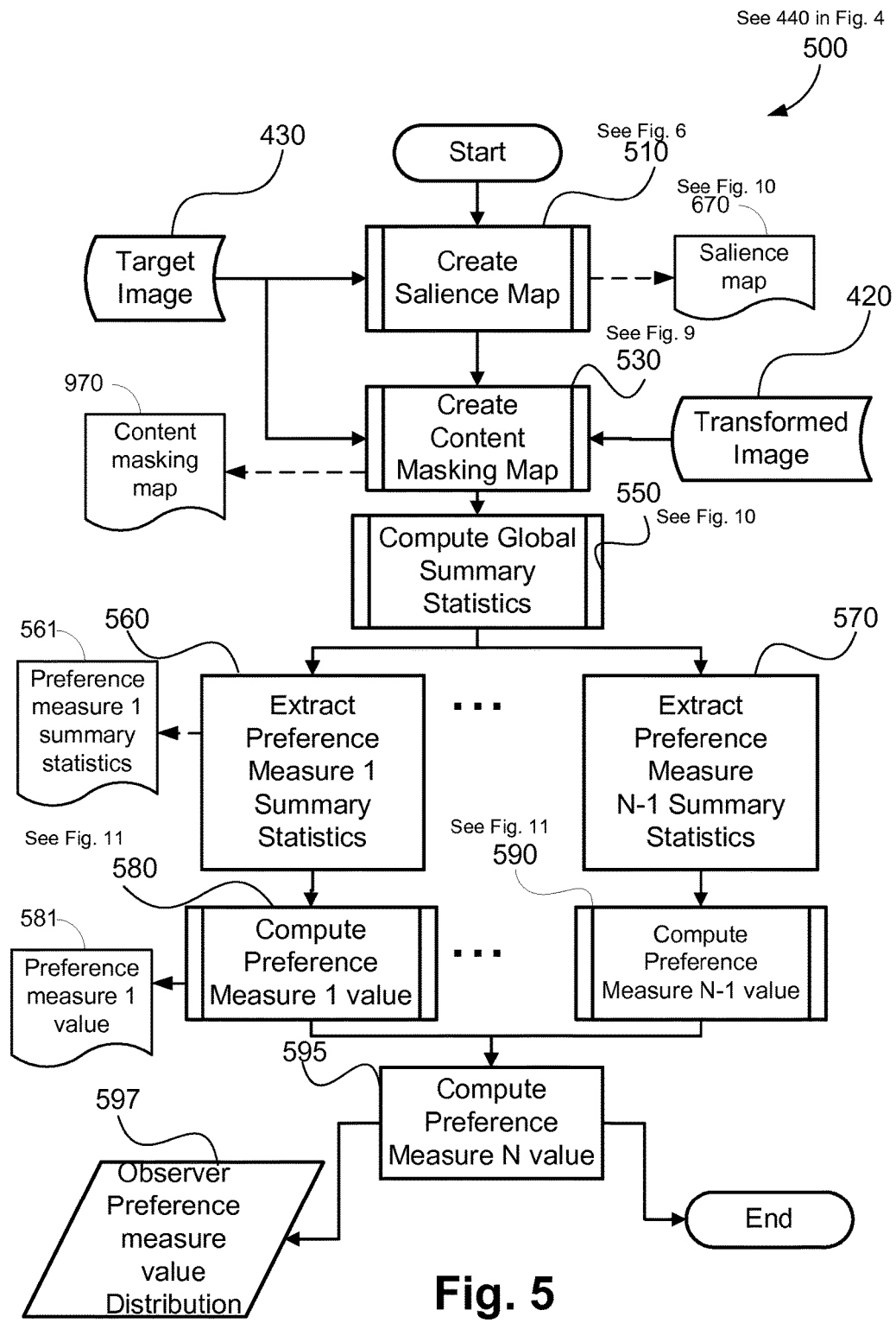
FIG. 5 is a schematic flow diagram illustrating a method of computing an observer preference value distribution according to one MDOF arrangement.

FIG. 5 is a schematic flow diagram illustrating a method 500 of computing an observer preference value distribution according to one MDOF arrangement. In particular, FIG. 5 shows a method 500, performed by the processor 1605 directed by the MDOF software application 1633, for determining an observer preference value distribution that can be used by the step 440 of method 400. The method 500 starts at a step 510, performed by the processor 1605 directed by the MDOF software application 1633, that creates a salience map 670 from the target image 430. The salience map indicates which portions of the target image 430 would be viewed most often or would be of most interest to an observer. Examples of salience maps and a method to create a salience map are described hereinafter in more detail below with reference to FIG. 6. The step 510 creates a salience map for the target image 430, however variations on step 510 may be more appropriate in specific MDOF arrangements, including creating a salience map for the transformed image 420 in addition to (or instead of) the salience map created for the target image 430. In some MDOF arrangements, the step 510 may be skipped entirely. The method 500 then proceeds to a step 530, performed by the processor 1605 directed by the MDOF software application 1633, which creates a content masking map 970 (described hereinafter in more detail with reference to FIG. 9). A content masking map indicates regions of the target image 430 and transformed image 420 where the differences between the target and transformed images would be visible to an observer. Examples of content masking maps and a method to create a content masking map are described hereinafter in more detail below with reference to FIG. 9.

The method 500 then proceeds to a step 550, performed by the processor 1605 directed by the MDOF software application 1633, which extracts a set of global summary statistics from the content masking map 970 and the salience map 670. The global summary statistics summarise information about the content masking map and the salience map that is required to determine the observer preference measure values in later steps in the process 500. Global summary statistics computed in step 550 may include the mean values of the salience map and the content masking map, measures of variation and structure within the salience map and content masking map, correlation between the salience map and the content masking map, mutual information between the salience map and content masking map, or other appropriate statistics. The global summary statistics may include other information such as details of the transform applied in the step 410 in the method 400, information about the target image 430, information about the transformed image 420, information about the user, or other appropriate information. Methods to implement the step 550 and further examples of summary statistics are described hereinafter in more detail below in regard to FIG. 10.

The method 500 then proceeds to extract the summary statistics relevant to each of the individual preference measures that will be used to form the preference value distribution 450. This is performed in steps 560 to 570, performed by the processor 1605 directed by the MDOF software application 1633. Thus, for example, the step 560 produces preference measure 1 summary statistics 561. In the case of a preference distribution that is represented as an N bin histogram, there are N−1 individual preference measures whose values need to be computed, these representing the N−1 degrees of freedom of the histogram. The values in each bin of the observer preference value distribution are constrained to sum to unity (if the histogram bins represent the probabilities of an observer holding a particular preference opinion) or one hundred (if the histogram bins represent the percentage of observers holding a particular preference opinion). Because of this constraint, the Nth preference measure value may be determined from the remaining N−1 preference measure values, and hence the observer preference value distribution has only N−1 degrees of freedom.

FIG. 5 shows only two steps to extract summary statistics, 560 and 570, however these steps are intended to represent N−1 steps to extract summary statistics relevant to each of the preference measures. In the steps 560 to 570, performed by the processor 1605 directed by the MDOF software application 1633, the global list of summary statistics created in the step 550 is examined and the summary statistics relevant to each preference measure are extracted. This can be done by having a list of the summary statistics relevant to each preference measure in the observer preference distribution 450. The steps 560 to 570 are ideally performed in parallel, but may be performed sequentially.

The method 500 then proceeds to determine the individual preference measure values that will form the preference value distribution. This is performed in steps 580 to 590, performed by the processor 1605 directed by the MDOF software application 1633. FIG. 5 shows only two steps to compute preference measure values, 580 and 590, however these are intended to represent N−1 steps to compute each of the N−1 preference measure values.

The steps 580 to 590 are ideally performed in parallel, but may be performed in series. Methods to implement the steps 580 to 590 are described hereinafter in more detail below, with reference to FIG. 11. The results of the steps 580 to 590 are N−1 preference measure values, such as a preference measure 1 value 581, for N−1 preference measure bins of the observer preference value distribution 450. In the case that the observer preference value distribution is a continuous value distribution parameterised by a mathematical formula, the steps 560 to 595 may be performed by a single step that computes the parameters of the mathematical formula describing the observer preference value distribution.

The method 500 then proceeds to a step 595, performed by the processor 1605 directed by the MDOF software application 1633, which determines the Nth preference measure value. As mentioned above, this can be done by setting the Nth preference measure value to unity minus the sum of the other N−1 preference measure values determined in the steps 580 to 590 above. The step 595 may also modify the N−1 preference measure values determined in the steps 580 to 590, if it is discovered that the computation described above for the Nth preference measure causes that preference measure value to be less than zero or greater than unity. In this case, the N−1 preference measures computed in the steps 580 to 590 may be adjusted so that the Nth preference measure value has an acceptable value. The output of step the 595 is the observer preference value distribution 597 (ie 450 in FIG. 4).

Although the process 500 has been described in regard to determining an observer preference value distribution such as 597 reflecting the preference of an observer for the target image 430 or the transformed image 420 formed by applying a transform to the target image 430, in fact the process 500 can be applied to two unrelated images, namely a first image (which can be the target image 430) and a second image (which can be the transformed image 420), in order to determine an observer preference value distribution reflecting the preference of an observer for the first image or the second image.

Method for Creating a Salience Map

A salience map indicates the regions of an image that will attract an observer's attention. There are, according to one approach, two processes by which the extent to which human attention is attracted to elements in a scene being viewed can be estimated. The first process is referred to as "bottom-up attention". Bottom-up attention is the tendency of humans to fixate on regions of an image having bright colours, high luminance, sharp edges or regions with luminance or colour characteristics different from surrounding areas of the image. Bottom-up attention does not require semantic understanding of the content of the image in question. The second process is referred to as "top-down attention". Top-down attention is the tendency of humans to fixate on regions in an image that contain content that is semantically important to them. The definition of semantically important content is highly dependent on the task that an observer is performing as they observe the scene, however in general semantically important content includes such content as faces, human bodies, and eyes. The presence of a human is an important piece of information in a scene and is likely to attract the interest of an observer. There exist techniques for creating salience maps in the prior art that recognise the presence of skin, faces and/or human body forms and assign higher salience values (indicating correspondingly greater tendency to attract a person's attention) to regions of images that contain these features. In the prior art, technology for creating salience maps based on top-down and bottom-up philosophies exist.

Image processing operations that affect salient areas of an image will have a stronger effect on the observer preference value distribution compared to image processing operations that affect non-salient areas of an image. This is because observers will more readily notice changes to an image that occur in salient areas because these areas are more closely examined by observers.

Figure 7A:
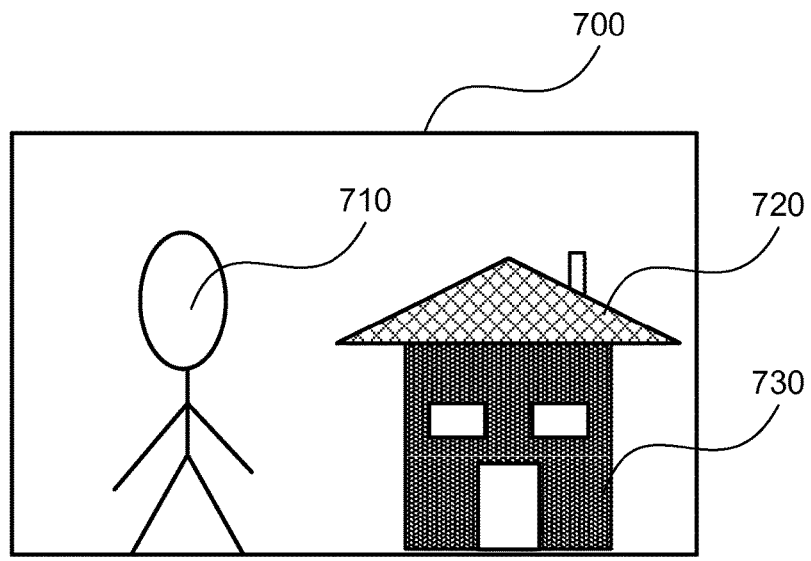
FIGS. 7A and 7B are representations of a salience map obtained from an image according to one MDOF arrangement.
Figure 7B:
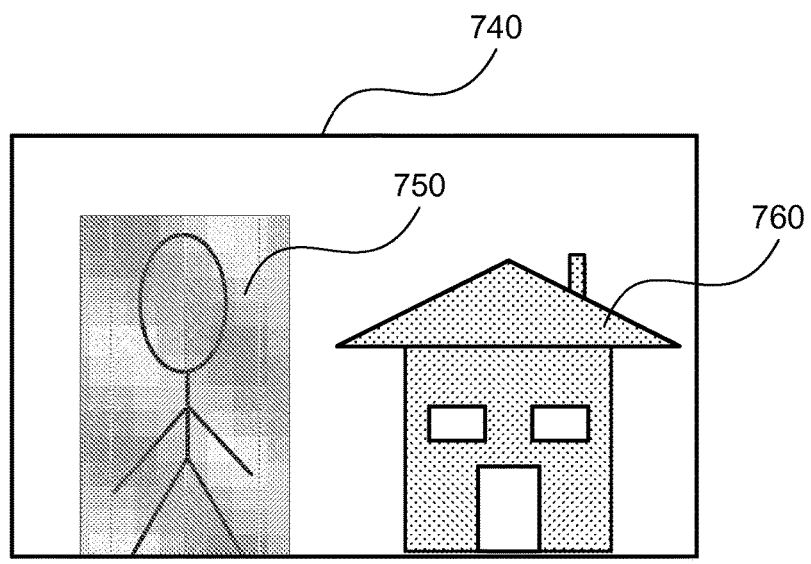

FIGS. 7A and 7B are representations of a salience map obtained from an image according to one MDOF arrangement. In particular, FIGS. 7A and 7B illustrate the concept of a bottom-up salience map. Image 700 in FIG. 7A is a target image. The image 700 contains a number of different types of content including an image 710 of a person that is sharply in focus, and an image 730 of a house with bright red walls and a grey roof 720. The house is in the background of the image 700 and is slightly out of focus. A salience map 740 in FIG. 7B is formed for this image. The salience map 740 indicates that the saliency of the image of the person 750 is higher than that of the image of the house 760. The saliency of the person 750 is higher due to the presence of more in-focus details compared to the house 760. Sharp details in an image attract more attention than out-of-focus details. A top-down salience map might also create a similar salience map as that shown in 740, applying more salience to the region of the person 750 due to the sematic importance of the human to the scene.

Figure 6:
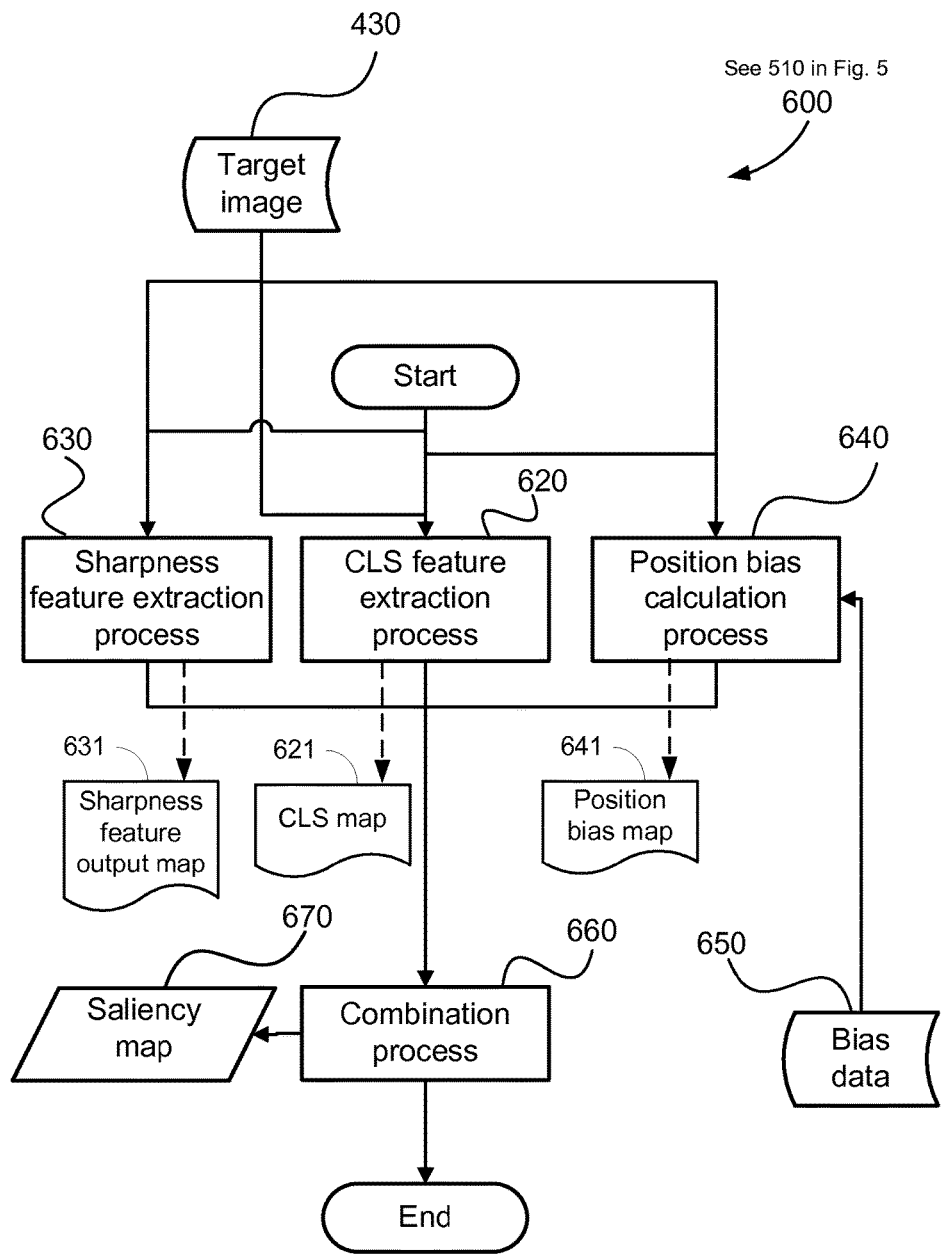
FIG. 6 is a schematic flow diagram illustrating a prior art method of computing a salience map.

FIG. 6 is a schematic flow diagram illustrating a method of computing a salience map. In particular, FIG. 6 depicts a prior art method for creating a salience map that can be used by the step 510 in method 500. The saliency prediction method 600 generates a saliency map 670 for a target image 430 by analysing the target image 430 using visual and computational features.

As described below, a target image 430, preferably in a standard colour encoding such as sRGB, is analysed separately by a CLS feature extraction process 620, a sharpness feature extraction process 630, and a position bias calculation process 640 based on bias data 650. The output of the processes 620, 630, and 640 are then combined by a combination process 660 to produce the saliency map 670.

When processed by the CLS feature extraction step 620, performed by the processor 1605 directed by the MDOF software application 1633, the target image 430 is processed by a scale decomposition process that decomposes the target image 430 into multiple representations at different scales based on size data. The size data represents the relative frequency of occurrence of image region sizes when viewed by a variety of observers as determined by psychophysical experiment. In a particular MDOF arrangement, the size data can be represented as the percentage, in terms of area, that a region covers compared to the size of the image. In a particular MDOF arrangement, the original size data is sampled using 7 downsampling values described below, that represent 3, 4, 5, 6, and 7 percent of the input image 430 area respectively. The input image 430 is downsampled according to the size data. The downsampling factor used in this MDOF arrangement is K where K=sqrt (100/S) with S being the size in percent and sqrt being the square root operator. The outputs of the scale decomposition process are multiple downsampled images, each of which corresponds to a size resulting from the size data. Each of the multiple downsampled images that are the output of the scale decomposition process 620 are transformed into a decorrelated luminance-chrominance perceptual colour space such as the CIELab colour space. Each transformed image is then separated into a series of elements, S. In a preferred MDOF arrangement, each image element is a pixel of the transformed image. In addition to the transformed image elements S; nS, the complement of the element S over the transformed image is also determined. For example, the transformed image element S may be a pixel in the transformed image and all the other pixels in the transformed image may be nS. In the preferred MDOF arrangement, for each element S and its complement nS, a brightness distance, a colour C1 distance, and a colour C2 distance are determined. The brightness distance is L(S)-L(nS), with L being the luminance as defined by the CIE Lab colour space; the colour C1 distance is C1(S)-C1(nS), with C1 being the perceptual colour axis defined as:

$$C1=2*(\cos(\mathrm{alpha})a-\sin(\mathrm{alpha})b)$$

where a and b are the red-green and blue-yellow components defined by the CIE Lab colour space, and alpha is 35 degrees. The colour C2 distance is C2(S)-C2(nS), with C2 being the perceptual colour axis as defined as:

$$C2=\sin(\mathrm{alpha})a+\cos(\mathrm{alpha})b$$

where a and b are the red-green and blue-yellow components respectively defined by the CIE Lab, and alpha is 35 degrees.

While the distances are here defined over a specific colour space and distance function, this should not be construed as an intrinsic limitation of the method. The outputs of distance functions are combined to form a global distance map over each of the downsampled images. For example, the global distance map for each downsampled images can be defined as $Gd(S,nS)=\mathrm{sqrt}\ ((L(S)-L(nS))^2+(C1(S)-C1(nS))^2+(C2(S)-C2(nS))^2)$.

These multiple distance maps form the input of a scale recomposition process that, depending on size data, weights the multiple distance maps and recombines them to form a colour-luminance-size (CLS) map. A colour-luminance-size (CLS) map 621 is the output of the CLS feature extraction step 620.

When processed by the sharpness extraction feature process 630, performed by the processor 1605 directed by the MDOF software application 1633, the target image 430 is first decomposed by a channel decomposition step into M channels 1, . . . , M depending on its initial colour encoding. For instance, if the input image 430 is a standard Red-Green-Blue encoded image, the number of channels M is equal to three: Red, Green, and Blue. Similarly, if the image is encoded in a chrominance-luminance colour space such as CIE Lab, the number of channels is also three: L, a, and b. For each channel, a three level wavelet decomposition is performed, for example using a Haar wavelet kernel. Once the decomposition has been performed, all of the wavelet decomposition coefficients apart from the LL layer of the last level are combined across all scales and orientations by coefficient combination. Once the coefficients are combined, the method averages values from all the M channels coefficients in the cross-channel combination step. The cross channel averaged map is then convolved with a 2-D Gaussian kernel of mean 0 and sigma of 2 degrees to produce the sharpness feature output map (in one MDOF arrangement, the input image 430 is viewed under a general viewing condition, so it is subtended 30 degrees horizontally). A sharpness feature output map 631 is the output of the sharpness extraction feature process 630.

When processed by the position bias calculation process 640, performed by the processor 1605 directed by the MDOF software application 1633, the target image 430 is analysed to determine its initial position measurement. The default initial position is the centre of the captured image. If metadata or additional information is present, the initial position can be determined, for example, as the focus point as defined by the camera AI servo or the area selected on a touch screen enabled image capture device. Pre-determined bias data 650 is used in this process to provide a weighting of image salience as the point of attention moves away from the initial position. In the process 600, the predetermined bias data was measured by psychophysical experiment and is modeled as a parameterised 2-D Gaussian function with mean (0.5w, 0.5h) and standard deviation (0.28w, 0.26h) where w and h are the width and the height of the input image 430, respectively. The initial position and the predetermined bias data 650 define a position bias map 641, a map that shows the relative importance of image parts depending on their position within the input image 430. The position bias map 641 is modeled as a parameterised 2-D Gaussian function centred on the initial position with a standard deviation of (0.28w, 0.26h) where w and h are the width and the height of the input image 430, respectively. The output of the position bias calculation process 640 is the position bias map 641.

The CLS map 621 outputted by the CLS feature extraction process 620, the sharpness feature output map 631 outputted by the sharpness extraction feature process 630 and the position bias map 641 outputted by the position bias calculation process 640 are combined into the final salience map 670 by a combination process 660, performed by the processor 1605 directed by the MDOF software application 1633. The CLS map 621 that is the output of the CLS feature extraction process 620 is normalised by dividing the CLS map by its maximal value so that its maximal value is equal to 1 (one). The CLS normalised map is then tested to determine whether its median value is greater than 0.5. If it is, the map is inverted so that the new map value is 1—the normalised CLS map value. The sharpness map 631 that is the output of the sharpness feature extraction process and is normalised by dividing it by its maximal value so that its maximal values becomes 1 (one). The normalised sharpness map is then tested to determine whether its median value is greater than 0.5. If it is, the map is inverted so that the new map value is 1—the normalised sharpness map value. The sharpness and CLS maps after normalisation and inversion are then compared to determine combination relative weights. In a preferred MDOF arrangement, the mean (average) value of the CLS map, mCLS, and the mean (average) value of the sharpness map, mSharp are calculated. Weights for the CLS map, wCLS, and the sharpness map, wSharp, are calculated as (2*mSharp)/(2*mSharp+mCLS) and (mCLS)/(2*mSharp+mCLS), respectively. Finally, the position map 641, the sharpness map 631, and the CLS map 621 are combined by a combination function 660, performed by the processor 1605 directed by the MDOF software application 1633. This combination function 660 can be additive, or point multiplicative. In a preferred MDOF arrangement, the combination function is wSharp*(SharpMap.*PosMap)+wSharp*(SharpMap)+wCLS*(MapCLS)+wCLS*(MapCLS.*PosMap) where ".*" is the point by point multiplication operator. The output of the combination function 660 can then be normalised and forms the salience map 670 of the input image 430. The salience map 670 is normalised such that the maximum of the map is unity and the minimum is zero.

Method 600 is a prior art method of computing a salience map 670 that may be used for the step 510. However there are many other methods for computing a salience map in the prior art that may be used in performing the step 510. For example a method that identifies faces in an image could be used in the MDOF arrangement as faces are a salient aspect of images as discussed above.

Method for Creating a Content Masking Map

A content masking map indicates the regions of an image that appear different to an observer after the image has been processed using an image processing transform. Whereas a salience map indicates the regions of an image that an observer might find interesting, a content masking map does not indicate regions of interesting content, but simply regions where if an observer were to study the transformed image, they would likely notice a difference between the original and transformed image. The regions of visible change indicated by the content masking map may not correspond to regions of interest to an observer. A salience map can be computed using only a single target image; however a content masking map requires additional information about the transform to be applied to the target image. In the preferred MDOF arrangement, the content masking map is created by comparing information in the target image to that in the transformed image. However, content masking maps can be created in a number of ways and some methods may simply require general knowledge of the image processing transform to be applied to the image in order to create a content masking map. The degree to which an image processing transform produces visible differences in a transformed image as shown in the content masking map will have an effect on the observer preference distribution between the target image and transformed image. This effect can be positive or negative and may depend on the salience map and other factors. An effect can be positive in the sense that for an image processing transform that overall improves the subjective quality of the image, the greater the parts of the content masking map with large values, the greater the preference for the transformed image. Conversely, an effect can be negative in the sense that for an image processing transform that overall decreases the subjective quality of the image, the greater the parts of the content masking map with large values, the less the preference for the transformed image.

Figure 8A:
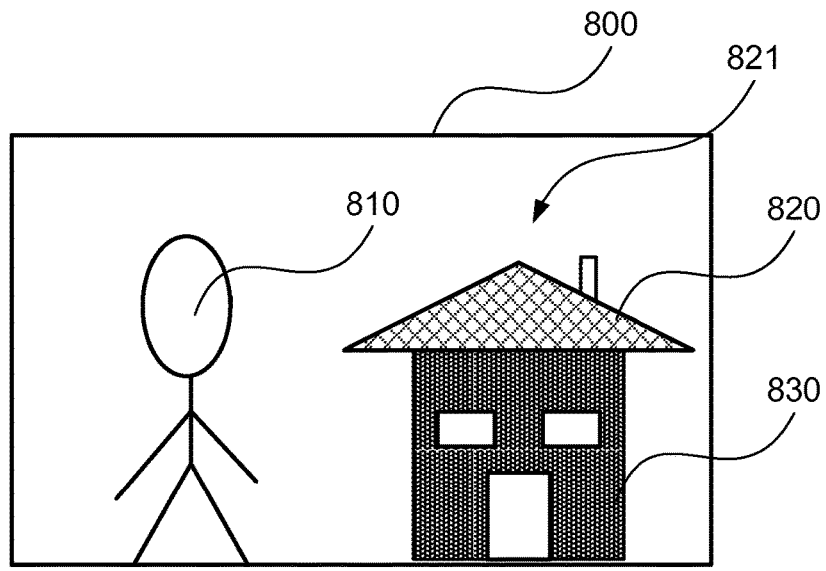
FIGS. 8A and 8B are representations of a content masking map obtained from an image according to one MDOF arrangement.
Figure 8B:
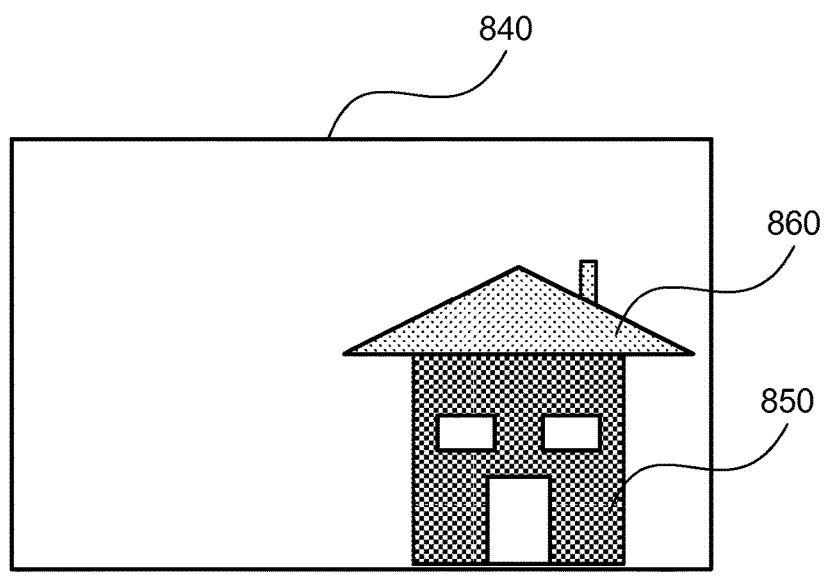

FIGS. 8A and 8B are representations of a content masking map obtained from an image according to one MDOF arrangement. In particular, FIGS. 8A and 8B illustrate the concept of a content masking map. An image 800 is the target image. The image 800 in FIG. 8A contains a number of different types of content including an image 810 of a person that is sharply in focus, and a house 821 with bright red walls 830 and a blue roof 820. The house 821 is in the background of the image 800 and is slightly out of focus. A transformed image (not shown) is created from the target image 800 by preferentially increasing the chroma of the image of the house walls 830 and the roof 820. The image 810 of the person is left untouched in the transformed image. A content masking map 840 in FIG. 8B is formed from this transformed image, in which the amount of difference likely to be detected by a person is depicted by the darkness of the region in the content masking map. The content masking map 840 thus indicates that the visual difference of the house walls 850 is the greatest change between the target image 800 and the transformed image, and accordingly the walls 850 are shown using the darkest cross hatching in the content masking map 840. The blue roof 820 in the target image 800 has also changed in the transformed image, although not to the same degree as the bright red walls of the house 820, as can be seen by the relatively lighter cross hatching used for the roof 820. Hence the content masking map 840 indicates that the blue roof 860 has changed between the target and transformed images although it is indicated at a lesser level than the bright red walls 850 in the content masking map. Although the saliency of the person 810 is high as discussed above, the person 810 has not changed as a result of the image processing transform and so it does not appear in the content masking map 840.

Figure 9:
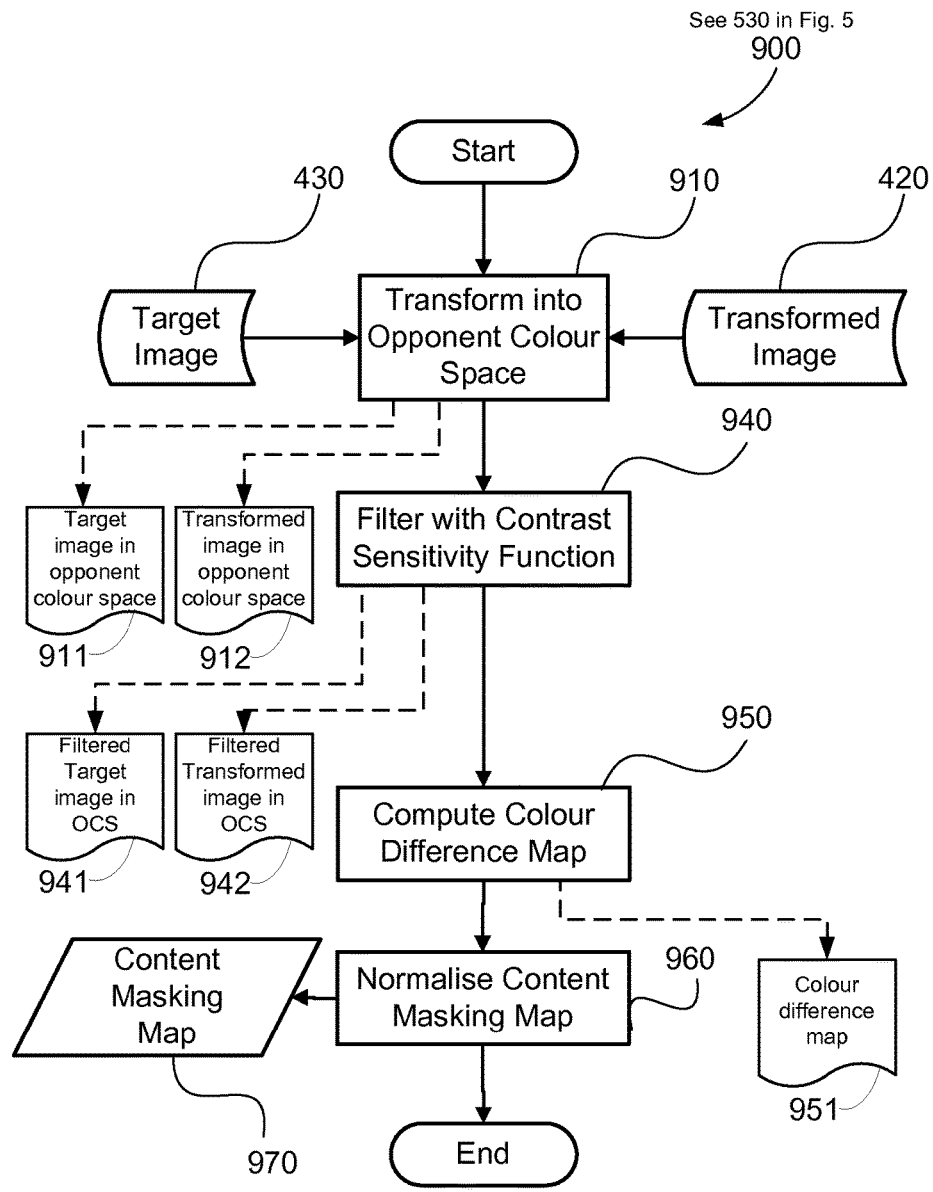
FIG. 9 is a schematic flow diagram illustrating a prior art method of computing a content masking map.

FIG. 9 is a schematic flow diagram illustrating a prior art method of computing a content masking map. In particular, FIG. 9 describes a prior art method for creating a content masking map that can be used by the step 530 in the method 500 depicted in FIG. 5. The content masking map prediction method 900 generates a content masking map 970 by analysing the differences between a target image 430 and a resultant transformed image 420 created by applying an image processing transform to the target image 430 that can be used by the step 410 in the method 400 depicted in FIG. 4. The method 900 starts at a step 910, performed by the processor 1605 directed by the MDOF software program 1633, the step 910 converting each pixel in the target image 430 and the transformed image 930 to an opponent colour space.

Opponent colour spaces support decomposition of images into dimensions that are matched to the representation of the image in the human visual system. Generally, opponent colour spaces have a channel for the luminance component of each pixel, the red-green chrominance component of each pixel and the blue-yellow chrominance component of each pixel. A suitable conversion to an opponent colour space for the step 910 is described in "Bernd Kolpatzik; Charles Bouman. Optimal Universal Color Palette Design for Error Diffusion. Journal of Electronic Imaging Apr. 1995, 4, pp. 131-143".

In the event that the transformed image 420 has a different resolution to that of the target image 430, either the transformed image 420 or the target image 430 can be resampled so that both images have the same resolution. The outputs of the step 910 are, respectively, representations 911, 912 of the target image 430 and transformed image 930 in the opponent colour space. The method 900 then proceeds to a step 940, performed by the processor 1605 directed by the MDOF software program 1633, which filters the colour difference map with a human contrast sensitivity function. Human contrast sensitivity functions model the ability of a human to view fine details in an image. Differences between the target image 430 and the transformed image 420 below a certain resolution will not be noticeable by a human observer depending on the distance from the images being viewed. The human contrast sensitivity function has a form that drops off at higher spatial resolutions to reflect this fact. The human contrast sensitivity function is applied to each of the components of the representations 911, 912 of the target image 430 and the transformed image 420 respectively in the opponent colour space. Generally the form of the human contrast sensitivity function used in the step 940 differs for each component in the opponent colour space. Suitable human contrast sensitivity functions to apply in step 940 are described in: "Bernd Kolpatzik; Charles Bouman. Optimal Universal Color Palette Design for Error Diffusion. Journal of Electronic Imaging Apr. 1995, 4, pp. 131-143". The outputs of the step 940 are, respectively, representations 941, 942 of the target image 430 and the transformed image 420 in the opponent colour space filtered by the human contrast sensitivity functions.

The method 900 then proceeds to a step 950, performed by the processor 1605 directed by the MDOF software program 1633, which determines colour differences between corresponding pixels in the opponent colour space filtered representations 941, 942 of the target image 430 and the transformed image 420 respectively. In the preferred MDOF arrangement this is performed by converting the opponent colour space filtered representations of the target image 430 and the transformed image 420 to the CIELAB colour space and computing the colour differences using the CIEDE formula defined in that space. Suitable calculations to be used in step 950 can be found in: "Bernd Kolpatzik; Charles Bouman. Optimal Universal Color Palette Design for Error Diffusion. Journal of Electronic Imaging Apr. 1995, 4 pp. 131-143". Other possibilities for implementing the step 950 include calculating the colour differences directly in the opponent colour space using appropriate formulae. The output of the step 950 is a colour difference map 951 that indicates the degree of visual difference between each pixel in the target image 430 and its corresponding pixel in the transformed image 420.

The method 900 then proceeds to a step 960, performed by the processor 1605 directed by the MDOF software program 1633. The step 960 normalises the colour difference map to a meaningful range to produce the content masking map 970. In the preferred MDOF arrangement the colour difference map 951 is normalised such that regions of the colour difference map indicating regions of the transformed image 420 that are substantially similar to the target image 430 such that observers would rarely notice differences are given values between 0 and 1. Regions of the colour difference map indicating regions of the transformed image 420 that are very different to the target image 430 such that observers would readily notice differences and describe those differences as significant are given values between 4 and 5. The output of the step 960 is the content masking map 970 suitable for use in subsequent stages of the method 500.

The method 900 is a prior art method of computing the content masking map 970 that may be used for the step 530.

However there are other methods for computing a content masking map in the prior art that can be used in step 530. For example a method that that includes aspects of image salience in the content masking map may be suitable for the step 530 and eliminate the need for step 510 in method 500.

Method to Compute Global Summary Statistics

Figure 10:
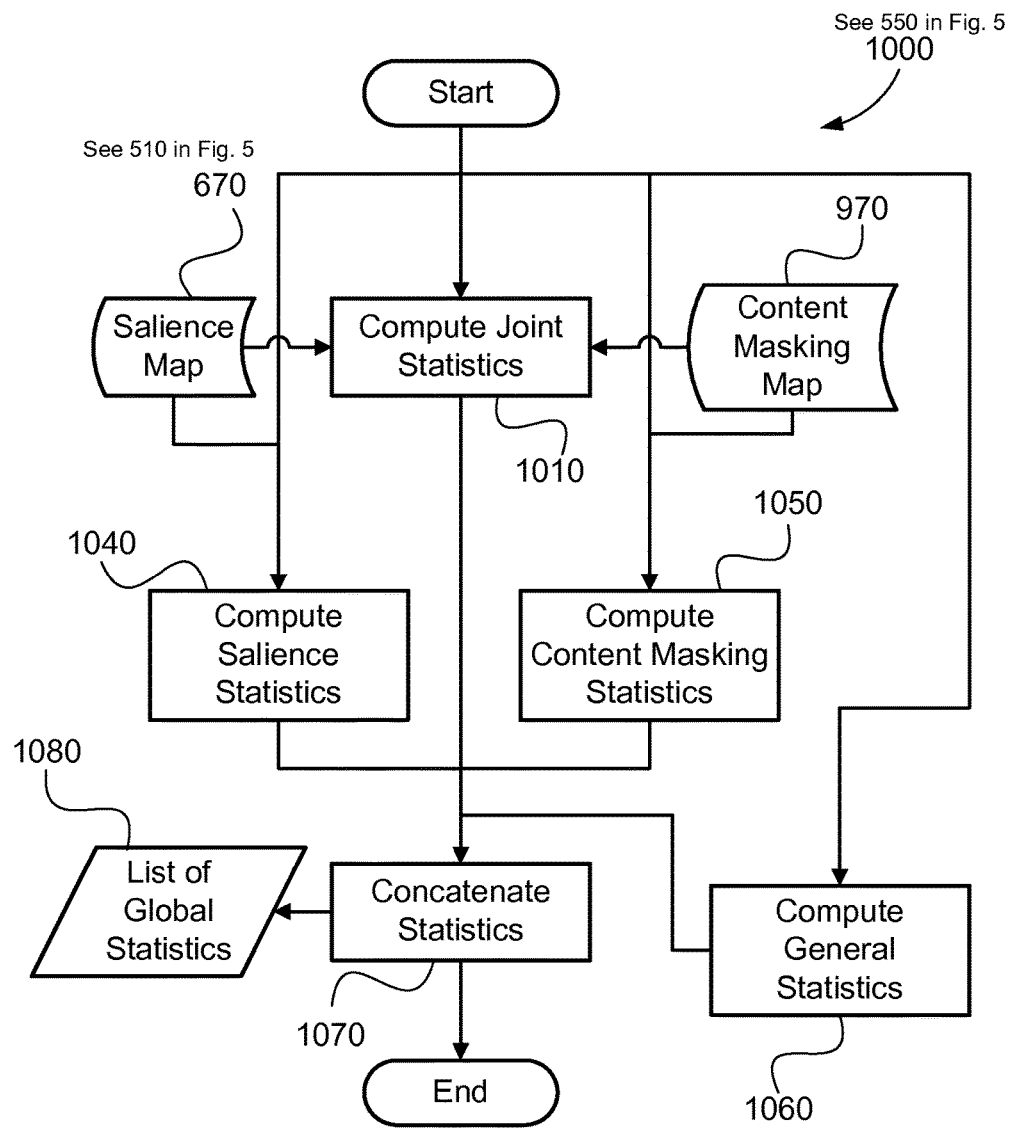
FIG. 10 is a schematic flow diagram illustrating a method of determining a set of global summary statistics according to one MDOF arrangement.
Figure 10A:
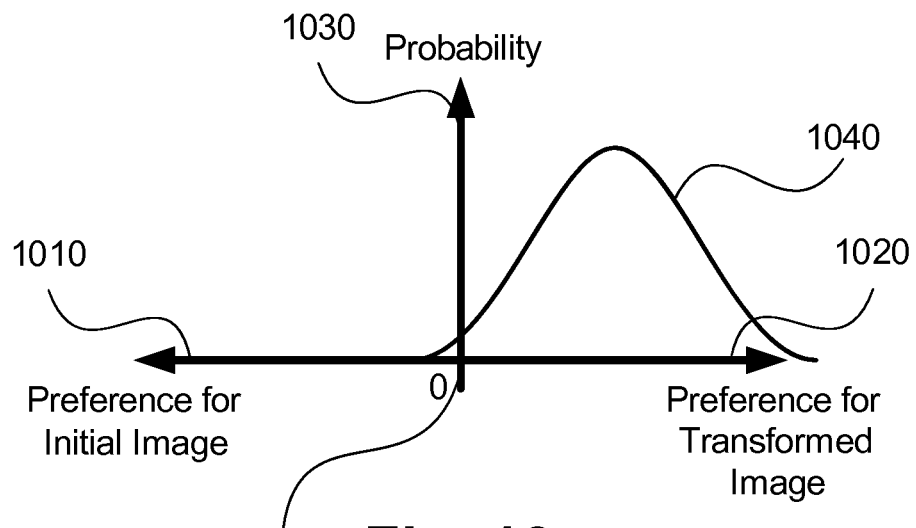
FIG. 10a is a representation of a distribution of observer preference scores.
Figure 10B:
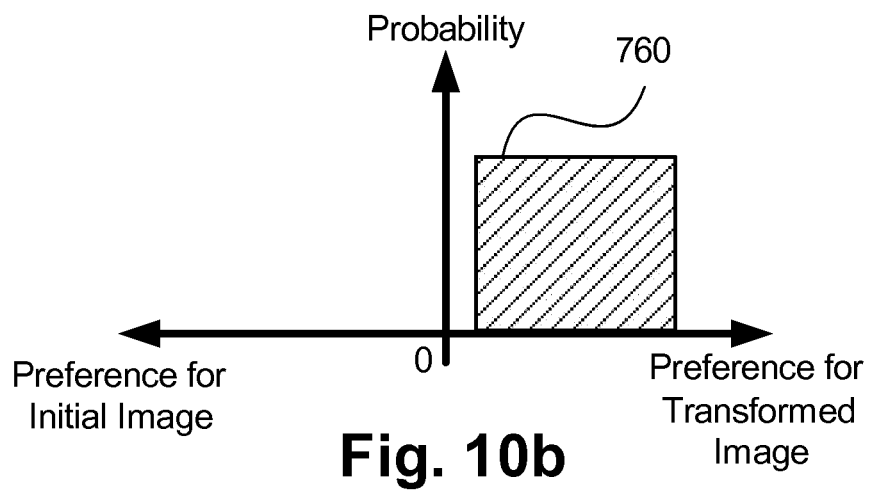

FIG. 10 is a schematic flow diagram illustrating a method of determining a set of global summary statistics according to one MDOF arrangement. More particularly, FIG. 10 depicts a method 1000 for determining global summary statistics from the content masking map 970 and the salience map 670 that can be used by the step 550 in the method 500 in FIG. 5. The method 1000 starts with steps 1010, 1040, 1050 and 1060, performed by the processor 1605 directed by the MDOF software program 1633, that may be performed in parallel or sequentially. If these steps are performed sequentially then they may be performed in any order.

The step 1040 determines statistics specific to the salience map 670 created in the step 510 in the method 500. In the preferred MDOF arrangement, the following statistics are determined:

| | |
|---|---|
| SM_coverage | A measure of what percentage of the target image contains salient objects: $$\sum_{i=1}^{M} \sum_{j=1}^{N} SM(i, j)/MN$$ where M is the number of rows in the target image and N is the number of columns and SM(i, j) is the salience map 670. |
| SM_entropy | The entropy of the salience map: $$\sum_{j=1}^{J} hSM(j) \log hSM(j)$$ where hSM(j) is the value of the jth bin of the histogram (normalised to a sum of unity) of the values of the salience map 670 and J is the number of bins in the histogram (chosen to be 100 in this investigation). |
| WORIG_mean | The weighted mean of the chroma component of the target (unmodified) image where the weighting is given by the salience map of the target image. This is computed by converting the target image 430 into the CIELAB colour space and calculating: $$\sum_{i=1}^{M} \sum_{j=1}^{N} SM(i, j)\sqrt{a^*(i, j)^2 + b^*(i, j)^2} / \sum_{i=1}^{M} \sum_{j=1}^{N} SM(i, j)$$ where a*(i, j) and b*(i, j) are the a* and b* components respectively of the target image at pixel (i, j) in the CIELAB colour space. |
| ORIG_SM_corr | The two-dimensional linear correlation coefficient between the salience map and the chroma component of the target image. |
| WORIG_sal_meanratio | The ratio of the mean of the salience weighted chroma component of the target image over the unweighted chroma component of the target image: WORIG_mean/ORIG_meanC where ORIG_meanC is defined below. |
| WORIG_sal_sumratio | The ratio of the sum of the values of the weighted chroma component of the target image over the sum of the values of the unweighted chroma component of the target image. |

It is noted, however, that there are many other statistics that may be computed from the salience map 670 in the step 1040. Other examples include the variance, skew, kurtosis or mean of the values of the salience map 670.

The step 1050, performed by the processor 1605 directed by the MDOF software application 1633, determines statistics specific to the content masking map 970 created in the step 530 in the method 500. In the preferred MDOF arrangement, the following statistics are determined:

| | |
|---|---|
| CMmap_mean | The mean value of the content masking map 970. |
| CM_entropy | The entropy of the chroma content masking map 970: $$\sum_{j=1}^{J} hCM(j) \log hCM(j)$$ where hCM(j) is the value of the jth bin of the histogram (normalised to a sum of unity) of the values of the content masking map 970 and J is the number of bins in the histogram (chosen to be 100 in this example). |

There are, however, many other statistics that may be determined from the content masking map 970 in the step 1050. Other examples include the variance, skew, kurtosis or mean of the values of the content masking map 970.

The step 1010, performed by the processor 1605 directed by the MDOF software application 1633, determines statistics that quantify the similarity of the content masking map 970 and the salience map 670. In the preferred MDOF arrangement, the following statistics are determined:

| | |
|---|---|
| WCMmap_mean | The weighted mean value of the content masking map 970, where the weighting is by the image salience 670. For a target image of M rows and N columns, this is determined by: $$\sum_{i=1}^{M}\sum_{j=1}^{N} SM(i,j)CM(i,j) / \sum_{i=1}^{M}\sum_{j=1}^{N} SM(i,j)$$ where SM(i, j) is the (i, j)th pixel of the salience map 670 of the target image, CM(i, j) is the (i, j)th pixel of the content masking map 970 of the target image. |
| WCM_sal_meanratio | The ratio of the salience weighted mean of the content masking map over the unweighted mean content masking map 970: WCMmap_mean/ CMmap_mean |
| CM_SM_corr | The two-dimensional linear correlation coefficient between the salience map 670 and the content masking map 970 and/or between regions of the salience map 670 and regions of the content masking map 970. |
| WCM_sal_sumratio | The ratio of the sum of the values of the salience weighted content masking map over the sum of the values of the unweighted content masking map 970. |

There are, however, many other statistics that may be determined to quantify the similarity between the content masking map 970 and the salience map 670 in the step 1010. Other examples include measures of mutual information or earthmovers distance between the content masking map 970 and the salience map 670. In computer science, the earth movers distance (EMD) is a measure of the distance between two probability distributions over a region D. In mathematics, this is known as the Wasserstein metric.

The step 1060, performed by the processor 1605 directed by the MDOF software application 1633, determines other statistics that do not depend on either the content masking map 970 or the salience map 670 but may still be relevant to predicting observer preference. In the preferred MDOF arrangement, the following statistics are determined:

| | |
|---|---|
| ORIG_meanC | The mean of the chroma component of the target image 430. This is computed by converting the target image 430 into the CIELAB colour space and calculating: $$\sum_{i=1}^{M}\sum_{j=1}^{N} \sqrt{a^*(i,j)^2 + b^*(i,j)^2} / MN$$ where a*(i, j) and b*(i, j) are the a* and b* components respectively of the target image 430 at pixel (i, j) in the CIELAB colour space. |
| ORIG_meanL | The mean of the luminance component of the target image 430. This is computed by converting the target image 430 into the CIELAB colour space and calculating: $$\sum_{i=1}^{M}\sum_{j=1}^{N} L^*(i,j) / MN$$ where L*(i, j) is the L* component of the target image 430 at pixel (i, j) in the CIELAB colour space. |
| ORIG_entropy | The entropy of the chroma component of the target image 430: $$\sum_{j=1}^{J} hCO(j) \log hCO(j)$$ where hCO(j) is the value of the jth bin of the histogram (normalised to a sum of unity) of the values of the chroma component of the target image 430 and J is the number of bins in the histogram (chosen to be 100 in this example). |

There are, however, many other statistics that may be determined in the step 1060. Other examples include the variance, skew, kurtosis or mean of the values of different components of the target image 430. In addition, various statistics may be extracted from the transformed image 420 and used in the step 1060. Furthermore, information relating to an individual user or group of users may be extracted at this point allowing the observer preference distributions to be tailored to the preference behaviour of individual users or groups of users Once the steps 1010, 1040, 1050 and 1060 have been completed, the method 1000 then proceeds to a step 1070, performed by the processor 1605 directed by the MDOF software application 1633, which concatenates the statistics determined in the steps 1010, 1040, 1050 and 1060 into a list 1080 of global statistics and stores the list, for example in the memory 1609. Following the step 1070, method 1000 ends.

A Method to Compute Preference Measures

Figure 11:
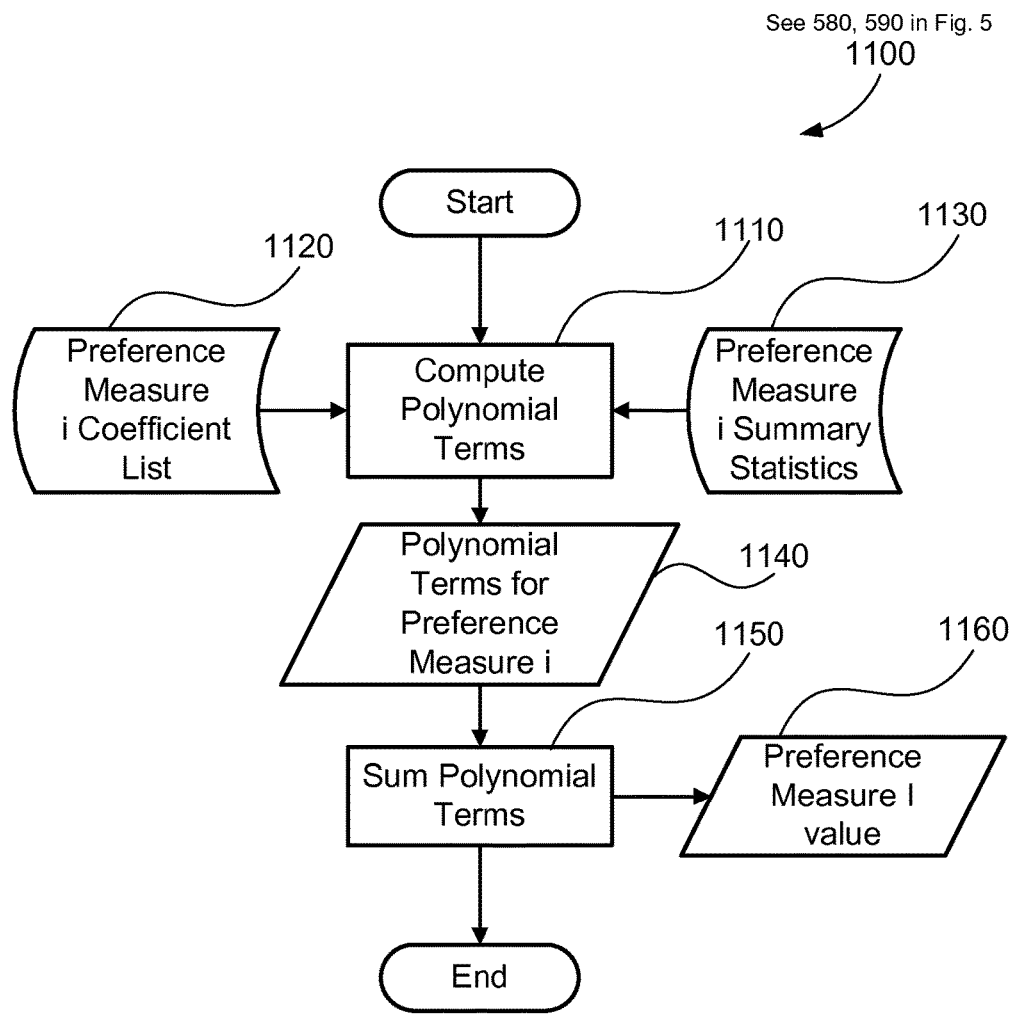
FIG. 11 is a schematic flow diagram illustrating a method of computing a preference measure according to one MDOF arrangement.

FIG. 11 is a schematic flow diagram illustrating a method of computing a preference measure value according to one MDOF arrangement. In particular FIG. 11 describes a method 1100 for computing the ith preference measure value that can be used by the steps 580 to 590 in method 500. The method 1100 can be used to compute preference measure values in the steps 580 to 590 regardless of the number of preference measures to be computed or which preference measure is being computed. The data used by method 1100 may change according to which preference measure is being computed, but the steps involved in the calculation will typically not change.

The method 1100 starts at a step 1110, performed by the processor 1605 directed by the MDOF software program 1633, which determines polynomial terms required to determine the ith preference measure value. Summary statistics specific to the ith preference measure that have been determined by the steps 560 to 570 in method 500 and stored as data 1130 in the memory 1609 are multiplied, in the step 1110, by corresponding polynomial coefficients that have previously been stored in a precomputed list 1120, to create polynomial terms 1140 for preference measure i.

The preference measure i coefficient list 1120 can be obtained by conducting a psychophysical experiment to model the effect that the particular transform applied in step 410 of method 400 has on the observer preference judgments. This psychophysical experiment can be performed by asking a set of observers to grade a range of images, before and after the transform in the step 410 has been applied to the target image 430 to form the transformed image 420, into N preference levels such as (A) "strongly prefer target image", (B) "prefer target image", (C) "no preference", (D) "prefer transformed image", . . . , (N) "strongly prefer transformed image". This is an N-1 degree of freedom MDOF arrangement. The aforementioned decisions by the observers can be used to determine measured observer preference distributions of the transform by determining the percentage of observers that had judgments in each of the N preference levels and converting the percentages into probabilities by dividing the percentages by 100. As noted, the measured observer preference distributions have N-1 degrees of freedom since each measured observer preference distribution must be constrained to sum to unity. Hence probabilities in each bin in the measured observer preference distribution may be modeled by N-1 preference measure values, one for each of N-1 preference levels of the N preference levels used in the experiment, with counts in the Nth bin estimated by subtracting the predicted counts (preference measures) computed for the other N-1 bins from unity.

By varying the parameters of the transform applied to the set of tested images and repeating the experiment, a set of measured observer preference distribution values can be obtained for different parameter values of the transform being studied. Regression techniques can then be used to create polynomial models to estimate the preference measures for the N-1 degrees of freedom for the measured observer preference distributions in the set. During the process of creating the preference measure values, the summary statistics (such as 561) from the content masking map 970 and the salience map 670 that best model the measured data can be determined for each preference measure and stored for use by the step 550 and the steps 560 to 570 in method 500. The coefficients of the polynomial models created to predict each preference measure can then be stored in the N-1 preference measure coefficient lists 1120.

It should be noted that the above technique can be used to create models that predict observer preference distributions for parameters values of the image processing transform outside of the set used in the experiment due to the continuous nature of the polynomial models used for each of the preference measures. In addition, due to the fact that the summary statistics presented above capture only the most pertinent information from the target image 430 and transformed image 420, the above technique can be used to create models that predict observer preference distributions for images not seen during the experiment used to create the models.

By way of example, an experiment performed by the inventors to create a model of observer preference distributions is now described. In this case, the transform being studied was a chroma boost applied to the target image. A chroma boost was applied to 26 experimental images at four different levels for each image (chroma boost factors of 1.1124, 1.2248, 1.3624, 1.5). The 26 experimental images were chosen to represent a range of different content. Fifty five observers took part in the experiment. The observers were checked for colour blindness and visual acuity using standard vision testing equipment. The observers viewed the images on a colour calibrated monitor in a controlled laboratory setting. The colour temperature and luminance level of the monitor's white point and the ambient illumination and the colour of the background were characterised and controlled.

A Sekonic Digitalmaster L-758 Cine Digital Light/Flash Meter was used to characterise the illuminance level of the experiment room lighting at 225 lux, and a Minolta CS 2000 spectroradiometer to verify the colour temperature of the room lighting.

The images were presented on an EIZO ColorEdge CG241W 24.1" display, at a colour temperature of 6500 Kelvin, a gamma of 2.2 and a white point luminance of 120 cd/m2. This monitor has a large gamut, and it reproduces most of the gamut of the Adobe RGB 1998 colour space. It was calibrated and characterised using an X-Rite i1 Pro spectrophotometer. We built its ICC profile using the X-Rite Profile Maker 5.11 software.

The native resolution of the monitor is 1920×1200 pixels, for a screen size of 52 by 32.8 cm, i.e. a resolution of 93 dpi. Observers were seated approximately 70 cm from the monitor, with the image filling approximately 30 degrees of their viewing field.

Each observer was asked whether they preferred the target image 430, preferred the transformed image 420 or had no preference (ie a two degree of freedom MDOF arrangement). So that knowledge of which of the images was the target image and which was the transformed image would not affect the observer's preferences for the images the two images were labelled "Image 1" and "Image 2". The computer would randomly select whether for any given participant, "Image 1" was the target image or the transformed image, while keeping track of which images were shown to the observer. Observers were free to toggle back and forth between the two images by pressing a key on the keyboard. A temporary grey screen was shown for 0.5 seconds between the two successive images, to prevent a flickering effect that might alter the observers' perception. A small low-contrast label was displayed on the side of the images to indicate whether image 1 or image 2 was displayed. When ready to make a judgment, the observers pressed another key on the keyboard to access a judgment dialog box. Using this dialog box the observers would indicate whether they preferred image 1, image 2 or had no preference. In the case that the observers indicated that they preferred either image 1 or image 2, the computer would recall which of image 1 and image 2 corresponded to the target and transformed images and hence assign the observer's indicated preference to either "preference for the target image" or "preference for the transformed image" accordingly. The measured observer preference distributions hence had three bins (like those shown in FIG. 3a and FIG. 3b), with two degrees of freedom. The two preference measures chosen to model were:

The probability that an observer would prefer the transformed image 420.

The probability that an observer would have no preference between the target 430 and transformed images 420.

The third preference measure "probability that an observer would prefer the target image" would be determined by the constraint that the observer preference distribution must sum to unity as described above.

For each of the two degrees of freedom target/transformed image salience maps such as 670 and content masking maps such as 970 were extracted and the summary statistics such as 561 described above were extracted. The table below shows determined summary statistics and corresponding coefficients determined from the experiment.

Polynomial Model for "probability that an observer would prefer the transformed image.":

| Summary Statistic | Polynomial Coefficient |
| --- | --- |
| Constant (Intercept term in model) | −0.34 |
| WCMmap_mean | 0.63 |
| CM_SM_corr | 0.54 |
| WCMmap_mean * CM_SM_corr | −0.16 |
| WCMmap_mean$^2$ | −0.1 |
| CM_SM_corr$^2$ | 0.31 |

Polynomial Model for "probability that an observer would have no preference between the target and transformed images.":

| Summary Statistic | Polynomial Coefficient |
| --- | --- |
| Constant (Intercept term in model) | 1.38 |
| WCMmap_mean | −0.54 |
| CM_SM corr | −0.98 |
| ORIG_meanC | −0.01 |
| WCMmap_mean * CM_SM_corr | 0.14 |
| WCMmap_mean$^2$ | 0.06 |
| CM_SM_corr * ORIG_mean | 0.02 |

The output of the step 1110 is a list 1140 of polynomial terms for preference measure i. In a step 1150, performed by the processor 1605 directed by the MDOF software program 1633, these polynomial terms are summed to create preference measure i value 1160. Following the step 1150, the method 1100 ends.

In the example above each preference measure value has been determined using a polynomial function of the summary statistics. It should be noted that method 1100 can however be performed in a number of different ways. For example, different functions of the summary statistics may be used including non-linear transforms, machine learning frameworks such as neural networks, or models based on cognitive processes used by observers during the process of judging image preference.

MDOF ARRANGEMENT EXAMPLE 1

One MDOF arrangement example that controls the display of images on a user interface is described hereinafter with reference to FIG. 12A and FIG. 12B. This MDOF arrangement may be implemented in the display 1614 on a camera 1601, computer or printer. In this MDOF arrangement, the target image 430 has been received by a computer or transmitted to a printer or captured by a camera 1601. The goal of this MDOF arrangement is to provide a user interface that a user can operate to transform the target image 430 and either save the transformed image (in the case of the computer or camera) or print the transformed image.

A set of possible image transforms to apply to the target image 430 is determined. These transforms may be selected from a list of popular image processing transforms that users often apply to images, or might be determined by analysing the target image 430 and determining possible transforms that might be used to improve the subjective quality of the target image 430. For example, if the target image (430) has an average luminance lower than some threshold, a possible transform to improve the image may be to raise the luminance of the image. These transforms might be transforms such as modifying contrast, chroma or luminance, applying noise filtering, or reducing the resolution or changing the aspect ratio of an image. One of the transforms is selected to process the image based on some criteria. For example, if the goal is to make the image more perceptually pleasing, a noise reduction, chroma adjustment or contrast adjustment transform might be selected. If the goal is to reduce the size of the image, a compression transform or downsampling transform might be selected. If the goal is to map the image to the reduced gamut of the printer, then a gamut mapping transform might be selected. The transform selected might be a selection of different image processing operations, any one of which might achieve the goal. The transform selected can be considered the "transform" referred to in the step 410 in the method 400. The selected transform has a number of parameters associated with it. For example, if the selected transform is a chroma modification, then the transform parameter might be a chroma modification factor to be applied by the chroma modification transform. If the selected transform is a collection of different image processing operations, then the transform parameter may be a decision parameter or flag establishing which of the different image processing operations is applied to the target image 430.

The transform is applied in the step 410 a number of times, and each time the parameter is adjusted, to thereby create a series of transformed images. The goal is to determine how best to display the set of transformed images on the device display 1614 so that the user can choose the one or more to store, print or further process. With reference to the method 400, the "process" referred to in the steps 460 and 470 can be considered to be the process of placing a transformed image on the device display 1614 and the process parameter, as computed in the step 460, can be considered to be the co-ordinate on the device display 1614 at which to place the transformed image.

Figure 12A:
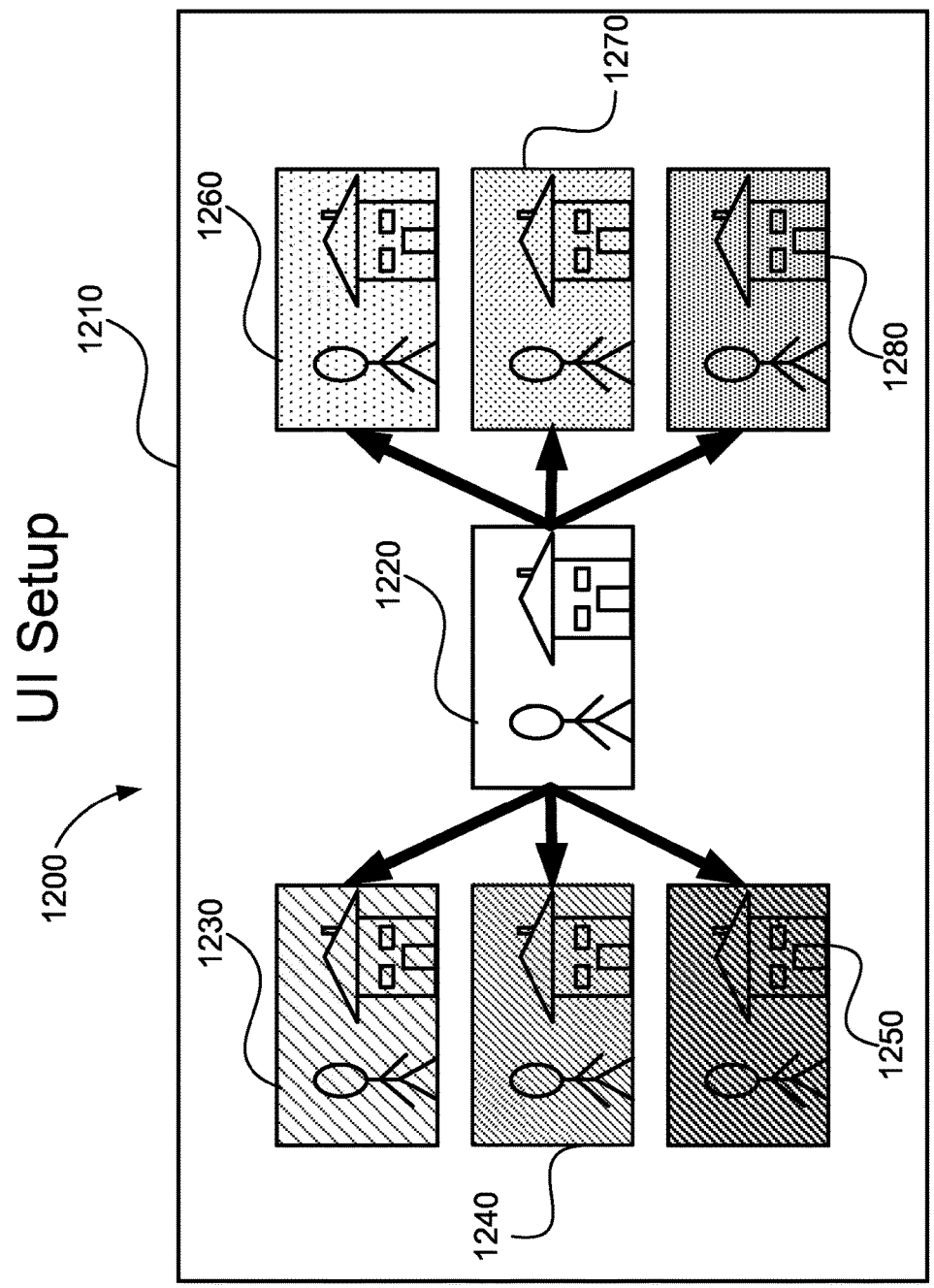
FIG. 12A is a diagram illustrating a method of the arrangement of images on a display according to one MDOF arrangement.

FIG. 12A shows a MDOF arrangement of this concept. A diagram 1200 shows a user interface setup on a device display 1210 on the screen 1614. The target image 430 is displayed in a central location 1220 on the display. For each of the transformed images described above, the step 440 in method 400 is used to compute a preference value distribution 450. The step 460 then examines the preference distribution values to determine where each of the transformed images should be placed on the device display 1210. For the sake of this example, we will consider a MDOF arrangement where the step 450 produces a preference distribution consisting of three preferences measures, indicating "preference for the target image", "no preference" and "preference for the transformed image".

One can propose many rules for placing the transformed images on the device display 1210. In the MDOF arrangement shown in FIG. 12A, a transformed image 420 is placed on the right of the displayed target image 1220 if the preference distribution 450 for the transformed image 420 predicts that the majority of observers would rate this image as preferable to the target image 430 and very few observers would rate the target image 430 as preferable to the transformed image 420. The vertical position of the transformed image could be set by the relative number of observers that the preference distribution 450 for the transformed image 420 predicts will have no preference between the target image 430 and transformed image 420. If the number of observers with "no preference" is predicted to be low, then the transformed image 420 might be placed in the top right corner 1260, since it is likely to be preferred by the user. If the number of observers with "no preference" is predicted to be moderate, then the transformed image 420 might be placed in the middle right edge 1270. If the number of observers with "no preference" is predicted to be high, then the transformed image 420 might be placed in the bottom right edge 1280, since it is possible that the user may feel indifferently toward this image.

In the MDOF arrangement shown in FIG. 12A, a transformed image 420 is placed on the left of the displayed target image 1220 if the preference distribution 450 for the transformed image 420 predicts that equal numbers of observers would rate this image as preferable to the target image 430 as those who would rate the target image 430 as preferable to the transformed image 420. Transformed images on the left of the displayed target image 1220 are those that are seen as "controversial". Observers may feel either strongly positively toward them, or strongly negatively toward them. It makes sense in this example to separate them from the transformed images on the right who whom the user is more likely to feel positive feelings. The vertical position of the transformed images on the left could be set by the relative number of observers that the preference distribution 450 for the transformed image 420 predicts will have no preference between the target image 430 and transformed image 420. If the number of observers with "no preference" is predicted to be low, then the transformed image 420 might be placed in the top left corner 1230. If the number of observers with "no preference" is predicted to be moderate, then the transformed image 420 might be placed in the middle left edge 1240. If the number of observers with "no preference" is predicted to be high, then the transformed image 420 might be placed in the bottom left edge 1250. If the preference distribution 450 for the transformed image 420 predicts that the majority of observers would rate the target image 430 as preferable to the transformed image 420, then the transformed image 420 may be discarded without being displayed to the user, since it is likely that this image will not be preferred by the user.

Figure 12B:
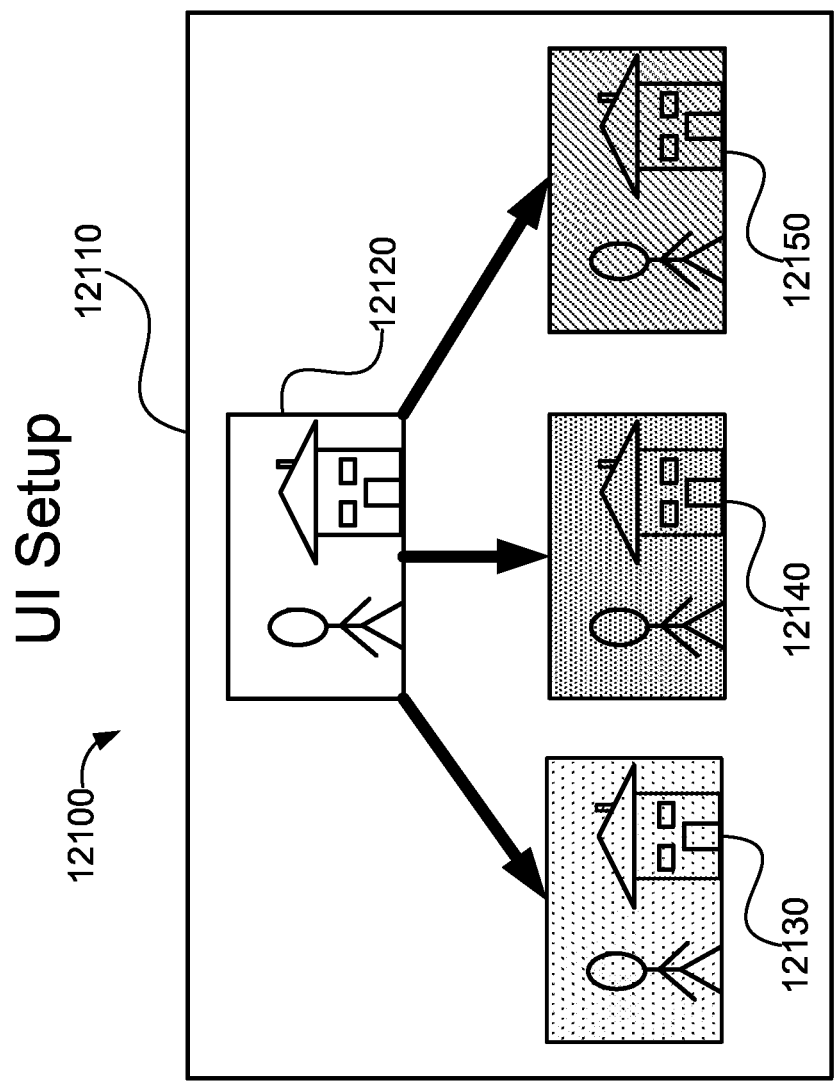
FIG. 12B is a diagram illustrating a method of the arrangement of images on a display according to another MDOF arrangement.

FIG. 12B shows another MDOF arrangement of this concept. A diagram 12100 shows a user interface setup on a device display 12110 on the screen 1614. The target image 430 is displayed in a central location 12120 on the display. Transformed images are displayed below the displayed target image 12120.

In the MDOF arrangement shown in FIG. 12B, a transformed image 420 is placed on the bottom left 12130 of the displayed target image 12120 if the preference distribution 450 for the transformed image 420 predicts that the majority of observers would rate this image as preferable to the target image 430 and very few observers would rate the target image 430 as preferable to the transformed image 420 or have no preference between the target and transformed images. By placing this image on the bottom left, the user is likely to spot this image before the others on the display 12100, and since it is most likely to be selected by the user, spotting it first on the display may save the user effort searching for the transformed image they prefer. If the preference distribution 450 for the transformed image 420 predicts that equal numbers of observers would rate this image as preferable to the target image 430 as those who would have no preference between the target image 430 and the transformed image 420, then the transformed image may be displayed directly below the displayed target image 12120 at a position 12140. If the preference distribution 450 for the transformed image 420 predicts that equal numbers of observers would rate this image as preferable to the target image 430 as those who would rate the target image 430 as preferable to the transformed image 420, then the transformed image may be displayed on the bottom right at a position 12150 below the displayed target image 12120.

MDOF ARRANGEMENT EXAMPLE 2

Figure 13:
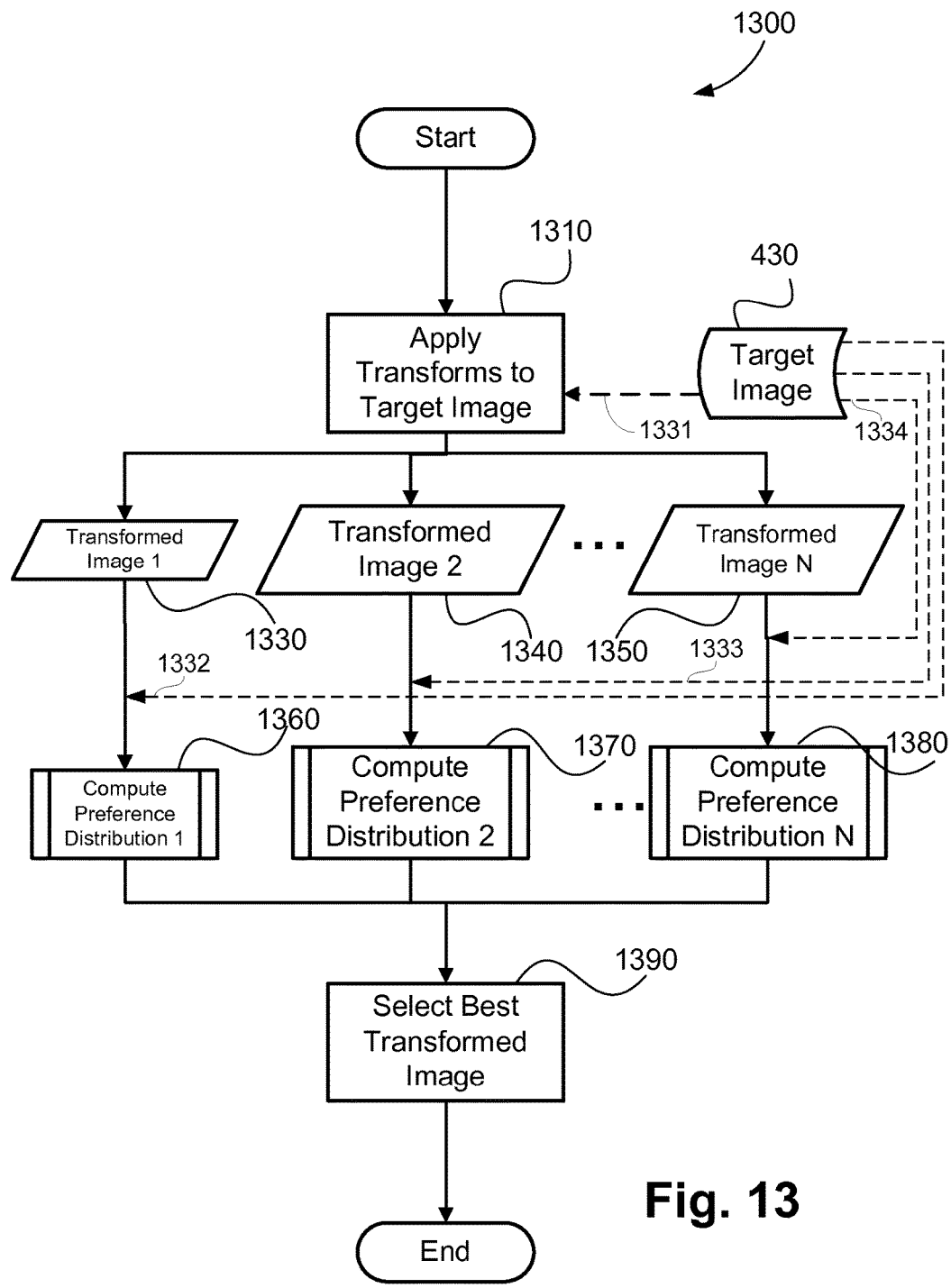
FIG. 13 is a schematic flow diagram illustrating a method of selecting an image according to one MDOF arrangement.

An MDOF arrangement 1300 that controls which image of a set of transformed images is selected for storage or subsequent processing is described hereinafter with reference to FIG. 13. This MDOF arrangement may be implemented in the display on a camera, computer or printer. In this MDOF arrangement, a target image 430 has been received by a computer or transmitted to a printer or captured by a camera. The goal of this MDOF arrangement is to select the best transformed image from a set of available transformed images. Once the best transformed image is selected it can be stored in the permanent memory 1625, or subsequently processed. A set of possible image transforms to apply to the target image 430 is determined. These transforms may be selected from a list of popular image processing transforms that users often apply to images, or might be determined by analysing the target image 430 and determining possible transforms that might be used to improve the subjective quality of the target image 430. For example, if the target image (430) has an average luminance lower than some threshold, a possible transform to improve the image may be to raise the luminance of the image. These transforms might be transforms such as modifying contrast, chroma or luminance, applying noise filtering, or reducing the resolution or aspect ratio of an image. One of the transforms is selected to process the image based on some criteria. For example, if the goal is to make the image more perceptually pleasing, a noise reduction, chroma adjustment or contrast adjustment transform might be selected. If the goal is to reduce the size of the image, a compression transform or downsampling transform might be selected. If the goal is to map the image to the reduced gamut of a printer, then a gamut mapping transform might be selected. The transform selected might be a selection of different image processing operations, any one of which might achieve the goal. The transform selected can be considered to be the "transform" referred to in the step 410 in the method 400. The selected transform has a number of parameters associated with it. For example, if the selected transform is a chroma modification, then the transform parameter might be a chroma modification factor to be applied by the chroma modification transform. If the selected transform is a collection of different image processing operations, then the transform parameter may be which of the different image processing operations is to be applied to the target image 430.

The method 1300 starts at a step 1310, performed by the processor 1605 directed by the MDOF software program 1633, which applies the transform a number of times, each time adjusting the aforementioned transform parameter, to create a series of transformed images 1330, 1340 to 1350. The method 1300 then proceeds to steps 1360, 1370 to 1380, each, performed by the processor 1605 directed by the MDOF software program 1633, each of which apply the step 440 in the method 400 to one of the transformed images to determine a corresponding preference distribution 450 for each of the transformed images 1330, 1340 to 1350. The step 440 in the method 400 requires information from both the target image 430 and from one of the transformed images 1330, 1340 and 1350. Accordingly, the target image 430 is provided to the step 1310 as depicted by a dashed arrow 1331. The target image 430 is also provided to the steps 1360, 1370 and 1380 as depicted by respective dashed arrows 1332, 1333 and 1334. The method 1300 then proceeds to a step 1390, performed by the processor 1605 directed by the MDOF software program 1633, where a transformed image is selected for further processing according to some criteria. There are many suitable criteria including selecting the transformed image that maximises the prediction of the probability of observers in the preference distribution that would prefer the transformed image, while simultaneously minimising the probability that observers would rate the image as less preferable than the target image 430 or have no preference between the target image 430 and the transformed image. If the image transform applied to the target image 430 in the step 1310 is likely to degrade the quality of the image (for example compression or down sampling), then the step 1390 may select the transformed image that maximises the prediction of the probability that an observer would have no preference between the target image 430 and transformed image while simultaneously minimising the probability that an observer would prefer the target image 430 over the transformed image.

MDOF ARRANGEMENT EXAMPLE 3

Figure 14:
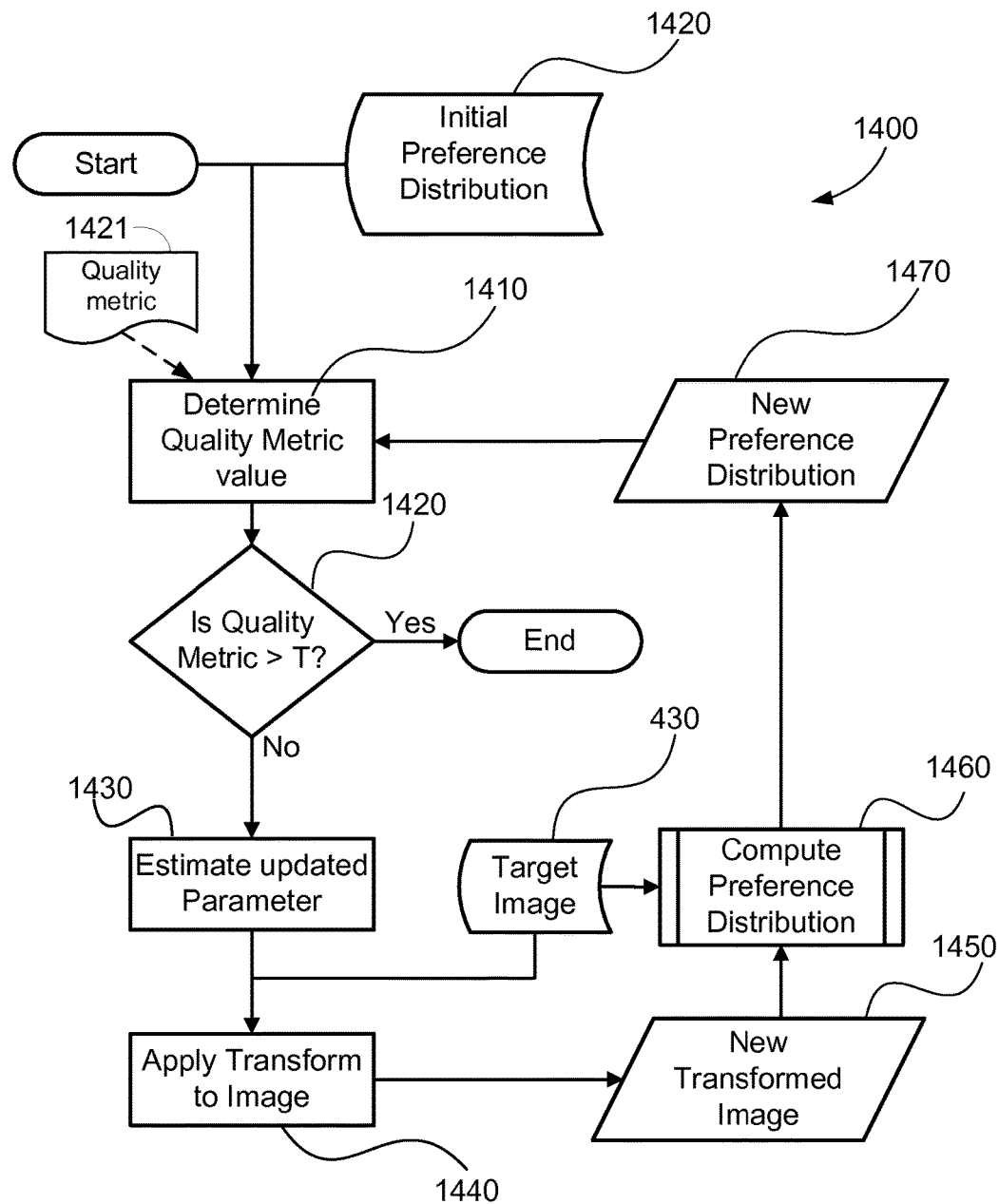
FIG. 14 is a schematic flow diagram illustrating a method of optimising a transform parameter according to one MDOF arrangement.

FIG. 14 is a schematic flow diagram illustrating a method of optimising a transform parameter according to one MDOF arrangement. Described hereinafter is a MDOF arrangement 1400 that automatically chooses the best transform parameters (ie the parameters associated with the transform applied in the step 410 in FIG. 4) to thereby optimise the quality of the transformed image 420. Prior to performing the method 1400, the steps 410 and 440 in the method 400 have been applied to a target image 430, to produce the transformed image 420 and an initial preference value distribution 1420 (this being a particular instance of the preference value distribution 450 in FIG. 4). A quality metric 1421 is also defined. There are many possible quality metrics that can be defined such as a ratio of the predicted probability of observers in the preference distribution 1420 that would prefer the transformed image over the sum of the probabilities in the other bins of the preference distribution 1420. Maximising this ratio would favour transformed images that would be preferred over the target image 430 by the largest number of observers. If the image transform applied to the target image 430 is likely to degrade the quality of the image (for example compression or down sampling), then the quality metric could be the ratio of the predicted probability that an observer would have no preference between the target image 430 and transformed image over the sum of the probabilities in the other bins of the preference distribution 1420. Maximising this ratio would favour transformed images that would be perceived as similar in appearance (at least in terms of preference) to the target image 430 by the largest number of observers. The method 1400 starts at a step 1410, performed by the processor 1605 directed by the MDOF software program 1633, which applies the quality metric 1421 to the initial preference distribution 1420 to obtain a value for the quality metric.

The method 1400 then proceeds to a step 1420, performed by the processor 1605 directed by the MDOF software program 1633, which compares the value of the quality metric to a threshold T. If the value of the quality metric is greater than T, then the method 1400 ends because the current transformed image meets the quality requirement and is considered to be of optimal quality (according to the quality metric value determined by the step 1410). If however the value of the quality metric is less than T, then the method 1400 proceeds to a step 1430, performed by the processor 1605 directed by the MDOF software program 1633. Suitable values of T will depend on the particular application, but in some applications, it has been found that a value of T=0.6 may be suitable.

The step 1430 adjusts (i.e. updates) the transform parameter depending on the value of the quality metric. In one MDOF arrangement, the value of the transform parameter might be increased when such an increase is known to improve the value of the quality metric. In other circumstances prior knowledge might indicate that the value of the parameter should be decreased to improve the value of the quality metric. If the correct sign of the change to the parameter is not known, the step 1430, performed by the processor 1605 directed by the MDOF software program 1633, can keep a list of prior adjustments to the transform parameter and the effect on the value of the quality measure, in this way learning through trial and error whether to increase or decrease the transform parameter to increase the value of the quality metric. In some MDOF arrangements the transform applied to the image may be parameterised by multiple parameters, each of which can be adjusted either up or down by step 1430.

The method 1400 then proceeds to a step 1440, performed by the processor 1605 directed by the MDOF software program 1633, which transforms the target image 430 using the image processing transform parameterised by the updated value of the transform parameter determined by the step 1430. The output of the step 1440 is a new transformed image 1450. It can be seen that the step 1430 is an instance of the step 460 in the method 400 and the step 1440 is an instance of the step 470 in method 400. In this MDOF arrangement the notion of a "process" in method 400 is the image processing transform applied to the target image 430.

The method 1400 then proceeds to step a 1460, performed by the processor 1605 directed by the MDOF software program 1633. The step 1460 implements the process used in the step 440 in the method 400 to determine a new prediction of the observer preference distribution 1470 for the target image 430 and the new transformed image 1450. The method 1400 then proceeds to the step 1410 where the quality metric value is determined based upon the new preference distribution 1470. The method 1400 continues in a loop, making adjustments and updates to the parameter of the transform, until the new transformed image 1450 produces a value of the quality metric that exceeds the threshold T. At this point, the new transformed image 1450 is considered to have been optimised with respect to the quality metric, and can be stored in permanent memory, displayed to the user, printed, or passed to subsequent processing.

Use-Case Example

Figure 15A:
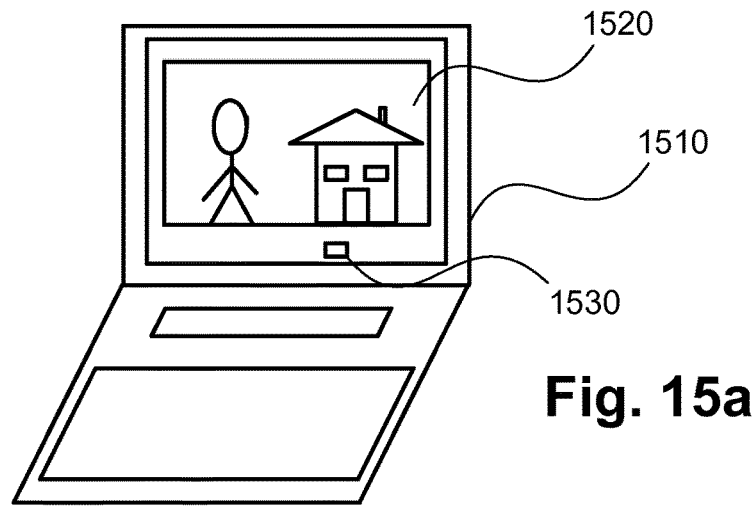
FIG. 15a is a diagram illustrating how the MDOF arrangement could be used on a computer to display an image to be transformed in one MDOF arrangement.

FIG. 15*a* depicts a use case of the MDOF arrangement. FIG. 15*a* shows a computer 1510 on which this MDOF arrangement can be performed. In this example, the user wishes to use the MDOF arrangement in order to find the optimal processing of an image 1520 currently shown on the computer's display. A button 1530 is also shown on the display that the user may click with their mouse in order to begin the image editing process.

Once the user has clicked on button 1530, the image is processed according to MDOF arrangement example 1 (see FIGS. 12A and 12B) described above with a number of different image processing transforms applied to the image 1520 to create a set of transformed images.

Figure 15B:
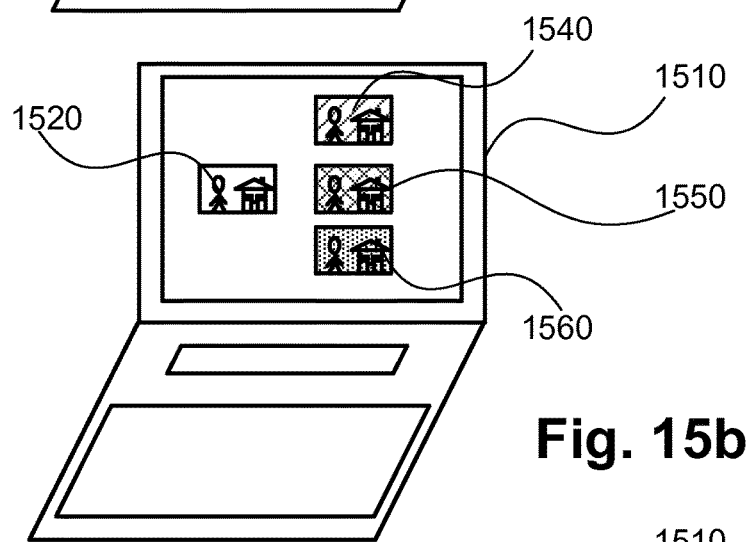
FIG. 15b is a diagram illustrating how the MDOF arrangement could be used on a computer to display a set of transformed images in one MDOF arrangement.

FIG. 15*b* shows the computer after the user has clicked on button 1530 in FIG. 15*a*. The locations of transformed images 1540, 1550 and 1560 on the computers display are set according to the method described in MDOF arrangement example 1 above, with the transformed image most likely to be preferred by the user placed at the top right of the display 1540. A transformed image 1550 that the MDOF arrangement predicts the user will have a strong feeling for but that feeling is equally likely to be negative or positive is placed in the middle right of the display. A transformed image 1560 that the MDOF arrangement predicts the user may feel indifferently toward is placed at the lower right of the display, as it is the least likely to be selected by the observer. The user selects the image 1540 by clicking on it with the mouse.

Figure 15C:
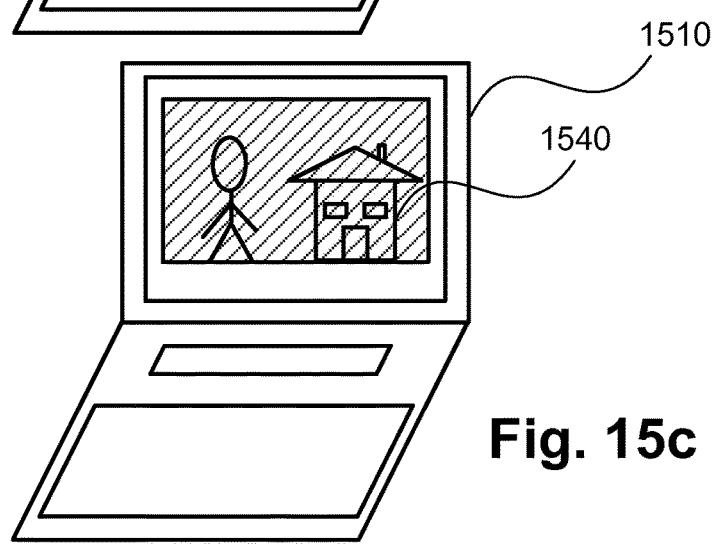
FIG. 15c is a diagram illustrating how the MDOF arrangement could be used on a computer to display a transformed image selected by a user in one MDOF arrangement.

FIG. 15*c* shows the computer 1510 with the transformed image 1540 selected by the user displayed at full resolution so that the user can appreciate their selection.

INDUSTRIAL APPLICABILITY

The arrangements described are applicable to the computer and data processing industries and particularly for the image processing industry.

The foregoing describes only some embodiments of the present invention, and modifications and/or changes can be made thereto without departing from the scope and spirit of the invention, the embodiments being illustrative and not restrictive.

I claim:

1. A computer implemented method for determining at least one parameter of an image process to be applied to a target image to form a transformed image, the method comprising the steps of:
   receiving the target image to be processed using the image process, the target image being associated with a salience map determined for the target image;
   receiving a content masking map associated with the target image, the content masking map comprising at least one metric corresponding to a degree of visual perceptibility of changes to the target image arising from the image transform being applied to the target image;
   combining the salience map and the content masking map to determine a distribution of a set of preference measures with respect to the image transform, at least one of the preference measures being associated with an intermediate preference with respect to two other preferences; and
   determining the at least one parameter of the image process in accordance with the determined distribution of the preference measures.

2. A computer implemented method for predicting preferences of an observer for a first image and a second image, the method comprising the steps of:
   receiving the first image and an associated salience map indicating regions of the first image that are likely to be scrutinized by the observer;
   receiving a content masking map indicating differences between the first image and the second image that the observer is likely to be able to perceive;
   determining a plurality of preference measures; and
   processing the salience map and the content masking map to determine a distribution of a set of values of the preference measures predicting the preferences of the observer for the first image and the second image, said set of values of the preference measures having a plurality of degrees of freedom.

3. A method according to claim 2 having three preference measures being (i) the observer preferring the first image over the second image, (ii) the observer preferring the second image over the first image, and (iii) the observer having no preference between the first image and the second image.

4. A method according to claim 2, wherein the step of processing the salience map and the content masking map comprises correlating the salience map and the content masking map.

5. A method according to claim 2, wherein the step of processing the salience map and the content masking map comprises correlating a region of the saliency map with a corresponding region of the content masking map.

6. A method according to claim 2, wherein the step of processing the salience map and the content masking map comprises one or more of the steps of:
   determining statistics of the salience map;
   determining statistics of the content masking map;
   determining joint statistics of the salience map and the content masking map; and
   wherein the method comprises the further steps of:
   extracting summary statistics for the preference measures; and determining the distribution of the set of values of the preference measures from the summary statistics.

7. A method for determining a value of at least one parameter of an image process to be applied to at least one of a target image and a transformed image formed by applying a transform to the target image, the method comprising the steps of:
   applying the image transform to the target image to form the transformed image;
   predicting preferences of an observer for the target image and the transformed image according to the method of claim 2, wherein the target image corresponds to the first image of claim 2 and the transformed image corresponds to the second image of claim 2; and
   determining the value of the parameter in accordance with the distribution of the set of values of the preference measures.

8. A method for selecting a transform to be applied to a target image, the method comprising the steps of:
   applying a set of transforms to the target image to form a corresponding set of transformed images;
   predicting a set of preferences of an observer for the set of transformed images according to the method of claim 2, wherein the target image corresponds to the first image of claim 2 and each transformed image corresponds to the second image of claims 2; and
   selecting the transform to be applied to the target image, from the set of transforms, in accordance with the distribution of the set of values of the preference measures.

9. A method for determining an optimal value of at least one parameter of an image transform to be applied to a target image, the method comprising the steps of:
   applying the image transform using a current value of the parameter to the target image to form a transformed image;
   predicting preferences of an observer for the target image and the transformed image according to the method of claim 2, wherein the target image corresponds to the first image of claim 2 and the transformed image corresponds to the second image of claim 2;
   defining a quality metric;
   determining a value of the quality metric;
   comparing the value of the quality metric to a threshold;
   if the value of the quality metric exceeds the threshold, defining the current value of the parameter as the optimal value of the parameter;

if the value of the quality metric does not exceed the threshold, performing the steps of:

updating the value of the parameter;

applying the image transform using the updated value of the parameter to the target image to form an updated transformed image;

predicting preferences of an observer for the target image and the updated transformed image according to the method of claim 2, wherein the target image corresponds to the first image of claim 2 and the updated transformed image corresponds to the second image of claim 2; and repeating the comparing and subsequent steps.

10. A distribution of a set of values of preference measures predicting preferences of an observer for a first image and a second image, determined according to the method of claim 2.

11. A computer implemented apparatus for predicting preferences of an observer for a first image and a second image, the apparatus comprising:

a processor; and a memory storing a computer executable software program for directing the processor to perform a method comprising the steps of:

receiving the first image and an associated salience map indicating regions of the first image that are likely to be scrutinized by the observer;

receiving a content masking map indicating differences between the first image and the second image that the observer is likely to be able to perceive;

determining a plurality of preference measures; and processing the salience map and the content masking map to determine a distribution of a set of values of the preference measures predicting the preferences of the observer for the first image and the second image, said set of values of the preference measures having a plurality of degrees of freedom.

12. A computer readable non-transitory storage medium storing a computer executable software program for directing a processor to perform a method for predicting preferences of an observer for a first image and a second image, the method comprising the steps of:

receiving the first image and an associated salience map indicating regions of the first image that are likely to be scrutinized by the observer;

receiving a content masking map indicating differences between the first image and the second image that the observer is likely to be able to perceive;

determining a plurality of preference measures; and processing the salience map and the content masking map to determine a distribution of a set of values of the preference measures predicting the preferences of the observer for the first image and the second image, said set of values of the preference measures having a plurality of degrees of freedom.

* * * * *